(12) United States Patent
Sarafijanovic et al.

(10) Patent No.: US 11,249,644 B2
(45) Date of Patent: Feb. 15, 2022

(54) MAGNETIC TAPE INTEGRATION WITH DISTRIBUTED DISK FILE SYSTEMS

(71) Applicant: International Business Machines Corporation, Armonk, NY (US)

(72) Inventors: Slavisa Sarafijanovic, Adliswil (CH); Martin Petermann, Zurich (CH); Bo Zou, Shanghai (CN); Jin Yin, Shanghai (CN); Feng Shao, Shanghai (CN); Jiong Lu, Shanghai (CN); Ning Wang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 16/574,939

(22) Filed: Sep. 18, 2019

(65) Prior Publication Data

US 2021/0081108 A1 Mar. 18, 2021

(51) Int. Cl.
*G06F 3/06* (2006.01)

(52) U.S. Cl.
CPC .......... *G06F 3/0604* (2013.01); *G06F 3/067* (2013.01); *G06F 3/0655* (2013.01)

(58) Field of Classification Search
None
See application file for complete search history.

(56) References Cited

U.S. PATENT DOCUMENTS

| | | | |
|---|---|---|---|
| 9,772,775 B2 | 9/2017 | Sarafijanovic et al. | |
| 10,162,527 B2 | 12/2018 | Abe et al. | |
| 10,353,740 B2* | 7/2019 | Vairavanathan | G06F 11/2069 |
| 2013/0159656 A1* | 6/2013 | Koarashi | G06F 3/0647 |
| | | | 711/165 |
| 2016/0162210 A1 | 6/2016 | Bucher et al. | |
| 2017/0052706 A1* | 2/2017 | Sarafijanovic | G06F 3/0644 |
| 2018/0121464 A1* | 5/2018 | Araki | G06F 3/0685 |
| 2019/0114088 A1 | 4/2019 | Vijayan et al. | |

OTHER PUBLICATIONS

Margaret Rouse, "SAN switch (storage area network switch)", Feb. 25, 2015, pp. 1-7, https://web.archive.org/web/20150225015928/https://searchstorage.techtarget.com/definition/SAN-switch-storage-area-network-switch (Year: 2015).*

(Continued)

*Primary Examiner* — Christopher D Birkhimer
(74) *Attorney, Agent, or Firm* — Zilka-Kotab, P.C.

(57) ABSTRACT

A computer-implemented method, according to one embodiment, is for integrating magnetic tape storage with a distributed disk file system. The computer-implemented method includes: registering for a subset of data operations that are recorded at a central location, where the central location is coupled to a plurality of distributed accessor nodes. A subset of available resources in one or more magnetic tape libraries that are coupled to the plurality of distributed accessor nodes are registered for and further managed. Moreover, a performance of the subset of data operations using the registered subset of available resources is scheduled. Supplemental data operations which correspond to the subset of data operations are also automatically received from the central location.

19 Claims, 17 Drawing Sheets

(56) References Cited

OTHER PUBLICATIONS

Zhang et al., "HPTFS: A High Performance Tape File System", 2006, pp. 1-14, http://citeseerx.ist.psu.edu/viewdoc/download?doi=10.1.1.184.1133&rep=rep1&type=pdf (Year: 2006).*

David A. Pease, "Linear Tape File System", IBM Almaden Research Center, 2011, pp. 1-18, https://www.snia.org/sites/default/orig/SDC2011/presentations/tuesday/DavidPease_LinearTape_File_System.pdf (Year: 2011).*

Siddhartheotia, "Advisory File Locking—My take on POSIX and BSD locks", Jun. 2, 2015, pp. 1-9, https://web.archive.org/web/20150602023354/https://loonytek.com/2015/01/15/advisory-file-locking-differences-between-posix-and-bsd-locks/ (Year: 2015).*

Lindsay Todd, "POSIX file system basics", Dec. 29, 2017, pp. 1-5, https://parallelstorage.com/2017/12/29/posix-file-system-basics/ (Year: 2017).*

Koltsidas et al., "Seamlessly Integrating Disk and Tape in a Multi-tiered Distribution File System," IEEE International Conference on Data Engineering (ICDE), 2015, pp. 1328-1339.

SNIA, "Linear Tape File System (LTFS) Format Specification," SNIA Technical Position, Version 2.2.0, Dec. 21, 2013, pp. 1-69.

IBM, "IBM Linear Tape File System Library Edition Version 2.1.4 now available for use on non-IBM tape libraries," IBM Europe, Middle East, and Africa Software Announcement ZP14-0493, Sep. 9, 2014, pp. 1-12.

IBM, "Library Sharing," IBM Knowledge Center, accessed on Sep. 9, 2019, 4 pages, retrieved from https://www.ibm.com/support/knowledgecenter/en/STQRQ9/com.ibm.storage.ts4500.doc/ts4500_ipg_3584_irlibcfs.html.

Haustein, N., "IBM Spectrum Archive Solution: An Introduction to an archive solution with IBM Spectrum Scale (GPFS) and Linear Tape File System Enterprise Edition (LTFS EE)," IBM, Version 3, May 19, 2015, pp. 1-26.

Schmuck et al., "GPFS: A Shared-Disk File System for Large Computing Clusters," Proceedings of the FAST 2002 Conference on File and Storage Technologies, Jan. 28-30, 2002, 15 pages.

Petermann, M., "LTFS Data Management," GitHub, 2019, 4 pages, retrieved from https://github.com/ibm-research/LTFS-Data-Management.

Quantum, "StorNext Scale-out Storage," Quantum Corporation, Apr. 2017, 2 pages, retrieved from https://iq.quantum.com/exLink.asp?6385812OR46V76I38238656&DS00469A&view=1.

Lustre, "Documentation," Lustre.org, accessed on Sep. 9, 2019, 1 page, retrieved from http://lustre.org/documentation/.

Oracle, "Lustre Software Release 2.x," Intel Corporation, 2017, 373 pages, retrieved from http://doc.lustre.org/lustre_manual.xhtml#lustrehsm.

Lustre, "Mounting a Lustre File System on Client Nodes," Luster Wiki, updated on Jul. 16, 2019, 3 pages, retrieved from http://wiki.lustre.org/Mounting_a_Lustre_File_System_on_Client_Nodes.

Borthakur, D., "HDFS Architecture Guide," The Apache Software Foundation, 2008, pp. 1-13, retrieved from https://hadoop.apache.org/docs/current1/hdfs_design.html.

Apache-Hadoop, "Archival Storage, SSD & Memory," The Apache Software Foundation, Aug. 18, 2016, 4 pages, retrieved from https://hadoop.apache.org/docs/r2.7.3/hadoop-project-dist/hadoop-hdfs/ArchivalStorage.html.

ASF Infrabot, "Mountable HDFS," Atlassian Confluence, Jul. 9, 2019, 5 pages, retrieved from https://cwiki.apache.org/confluence/display/HADOOP2/MountableHDFS.

\* cited by examiner

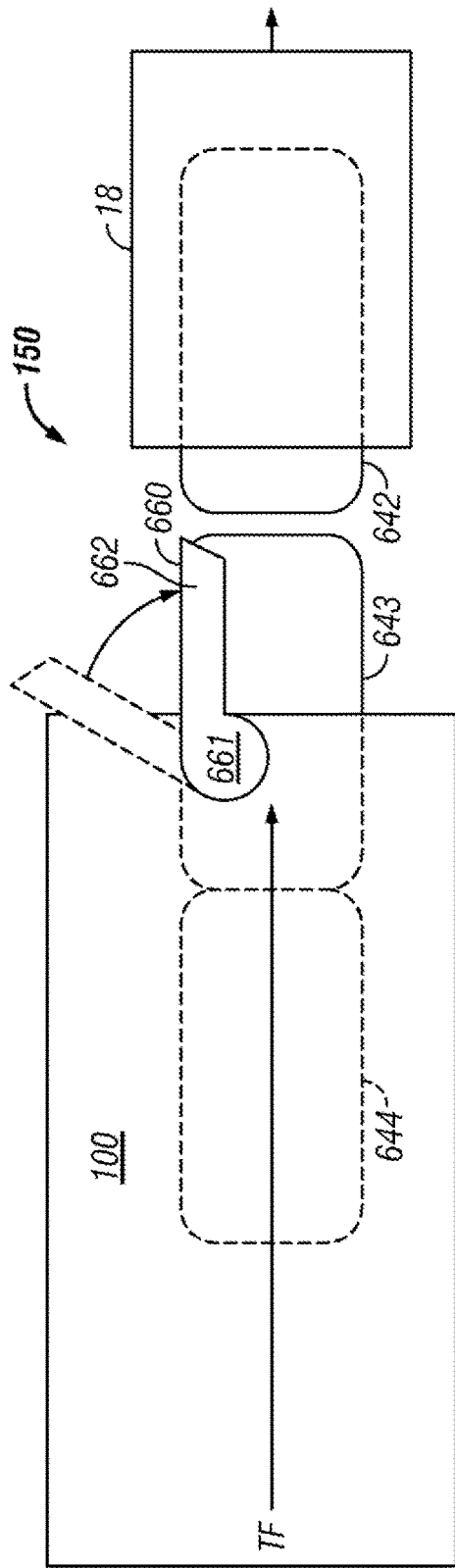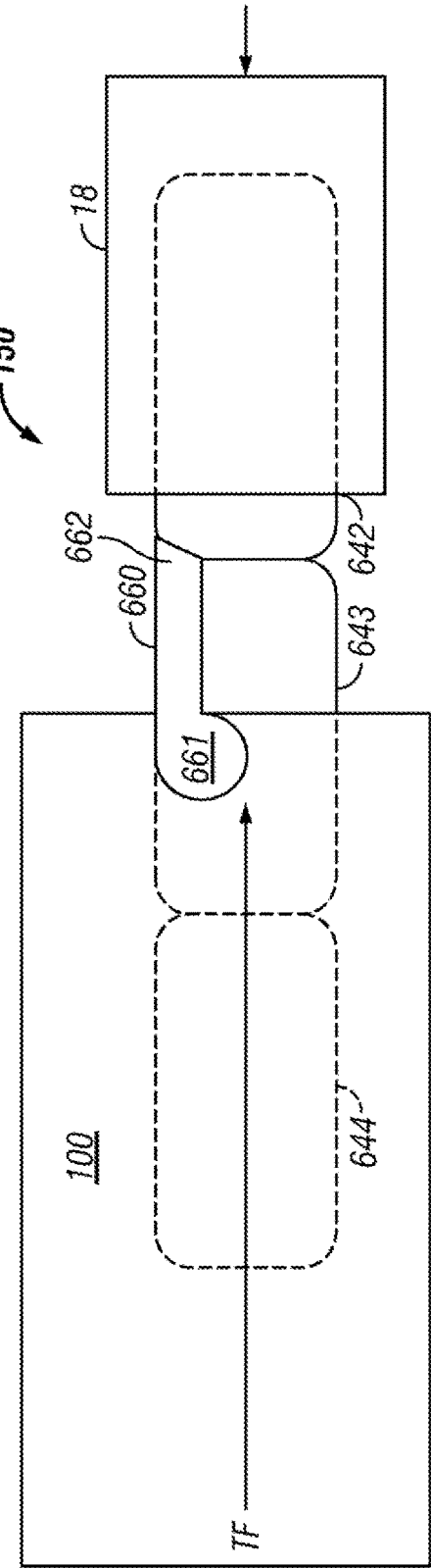

MAGNETIC TAPE INTEGRATION WITH DISTRIBUTED DISK FILE SYSTEMS

BACKGROUND

The present invention relates to data storage systems, and more particularly, this invention relates to integrating magnetic tapes with distributed disk file systems (DDFSs).

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or discs), electronic media (such as PROM, EEPROM, flash PROM, CompactFlash™, Smartmedia™, Memory Stick®, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the horizontal (X) and vertical (Y) directions.

In an effort to increase storage capacity, deep slot technology allows for storage cells that contain more than a single data storage cartridge. Such storage libraries allow for higher density, or more cartridges stored per square foot. In 'deep slot' libraries, two or more cartridges may be stored in a multi-cartridge deep slot cell, arrayed in series, one behind the other, in tiers ranging from a frontmost tier to a rearmost tier.

Magnetic tape storage is considered the most economical option for storing infrequently accessed data, mainly due to the low costs and reliability that is associated therewith. However, reading data from magnetic tape efficiently may be difficult in certain practical use cases, especially when the read operations may be initiated from multiple different accessor nodes. This is particularly true for DDFSs which include accessor nodes that are connected to a shared tape storage.

SUMMARY

A computer-implemented method, according to one embodiment, is for integrating magnetic tape storage with a distributed disk file system. The computer-implemented method includes: registering for a subset of data operations that are recorded at a central location, where the central location is coupled to a plurality of distributed accessor nodes. A subset of available resources in one or more magnetic tape libraries that are coupled to the plurality of distributed accessor nodes are registered for and further managed. Moreover, a performance of the subset of data operations using the registered subset of available resources is scheduled. Supplemental data operations which correspond to the subset of data operations are also automatically received from the central location.

A computer program product, according to another embodiment, is for integrating magnetic tape storage with a distributed disk file system. The computer program product includes a computer readable storage medium having program instructions embodied therewith. Moreover, the program instructions are readable and/or executable by a processor to cause the processor to: perform the foregoing method.

A system, according to yet another embodiment, includes: a processor, and logic integrated with the processor, executable by the processor, or integrated with and executable by the processor. Moreover, the logic is configured to: perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIGS. 8A-8D are partial side views of a cartridge blocking mechanism according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

One general embodiment includes a computer-implemented method for integrating magnetic tape storage with a distributed disk file system. The computer-implemented method includes: registering for a subset of data operations that are recorded at a central location, where the central location is coupled to a plurality of distributed accessor nodes. A subset of available resources in one or more magnetic tape libraries that are coupled to the plurality of distributed accessor nodes are registered for and further managed. Moreover, a performance of the subset of data operations using the registered subset of available resources is scheduled. Supplemental data operations which correspond to the subset of data operations are also automatically received from the central location.

Another general embodiment includes a computer program product for integrating magnetic tape storage with a distributed disk file system. The computer program product includes a computer readable storage medium having program instructions embodied therewith. Moreover, the program instructions are readable and/or executable by a processor to cause the processor to: perform the foregoing method.

In yet another general embodiment, a system includes: a processor, and logic integrated with the processor, executable by the processor, or integrated with and executable by the processor. Moreover, the logic is configured to: perform the foregoing method.

Figure 1:
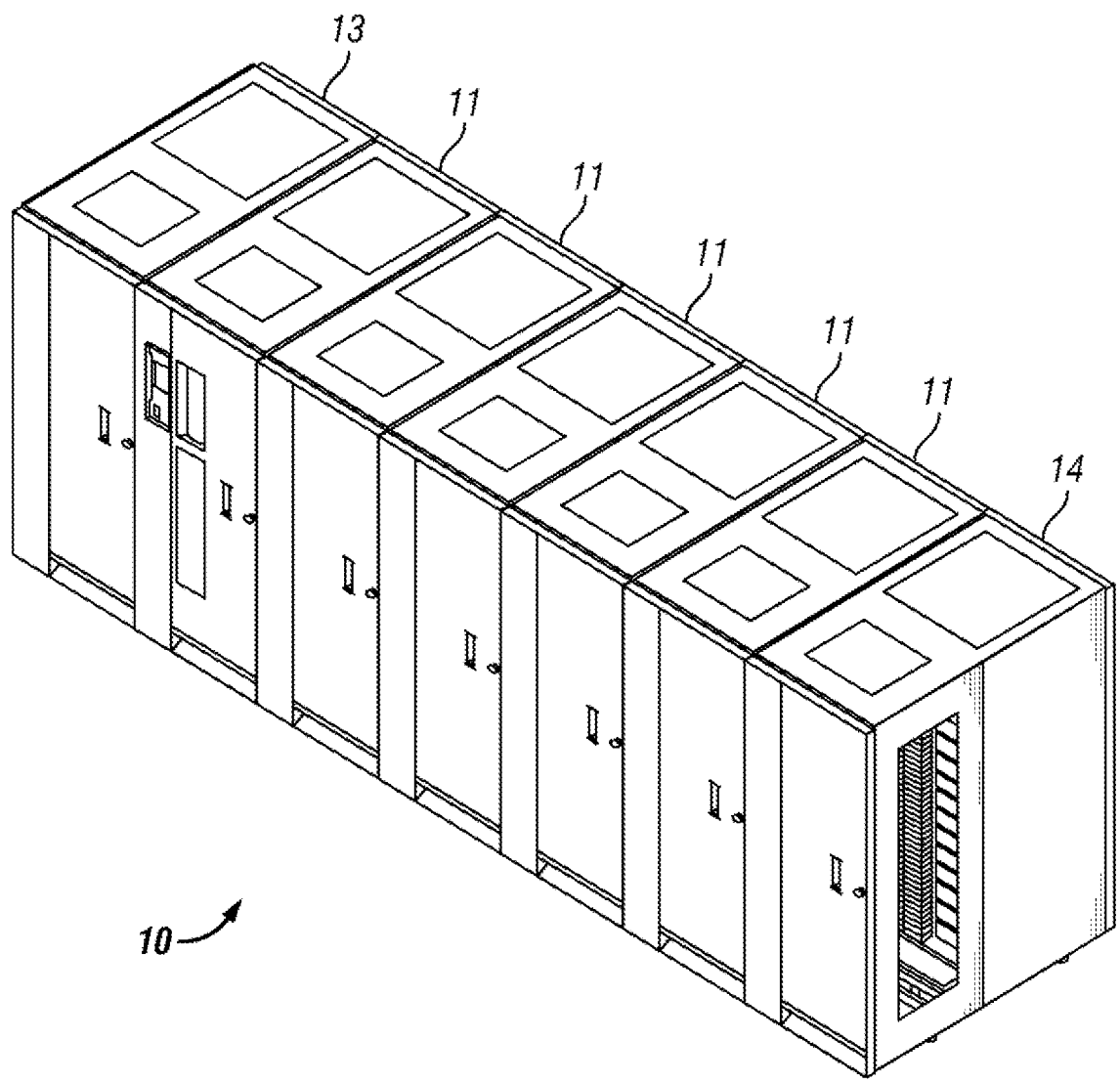
FIG. 1 is a perspective view of an automated data storage library according to one embodiment.
Figure 2:
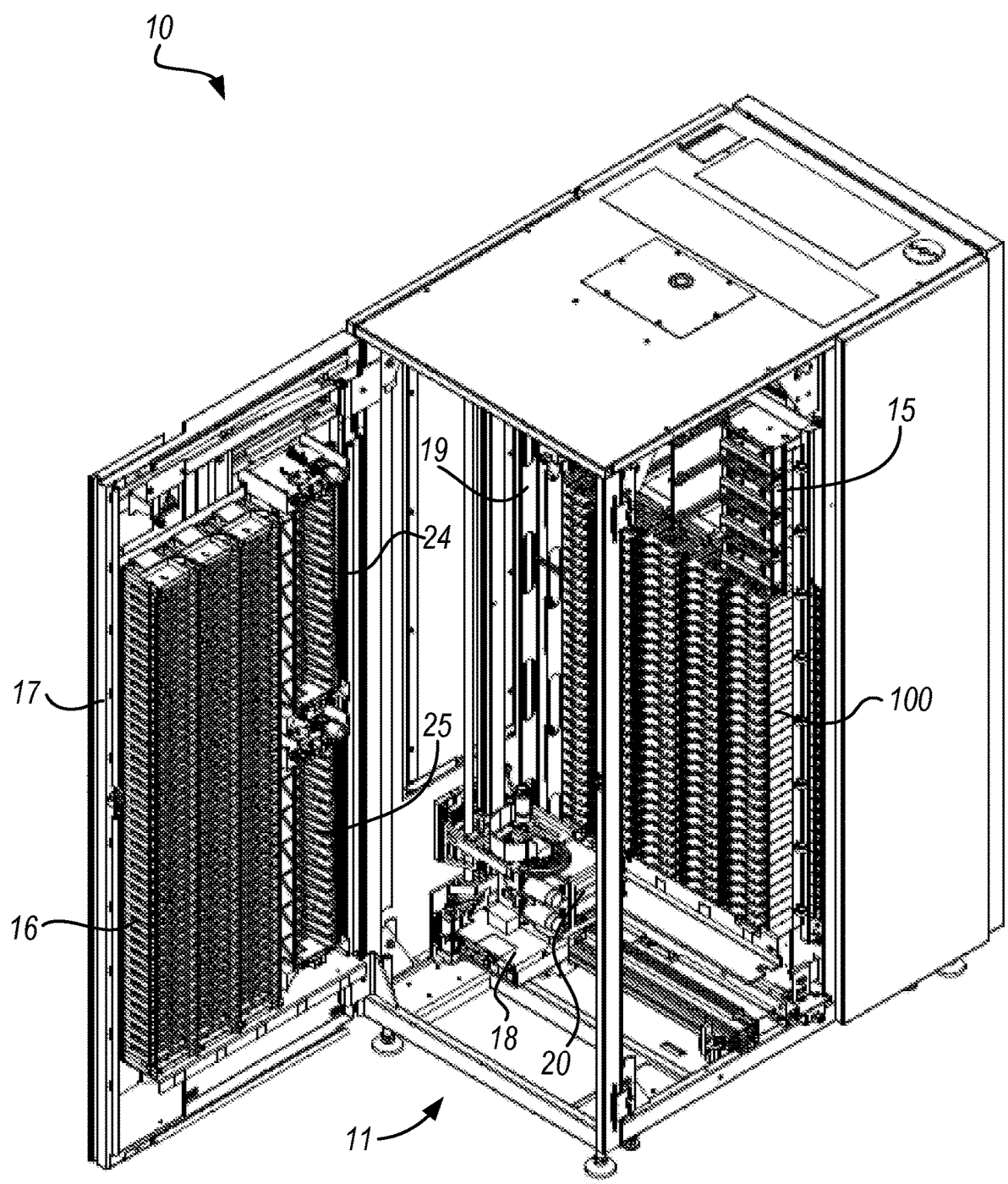
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM® 3584 UltraScalable Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disc drives, magnetic tape drives, solid state drives having non-volatile random access memory (NVRAM) such as Flash memory, or other types of data storage drives as are used to read and/or write data with respect to the data storage media.

As illustrated, the storage frame 11 may optionally include an operator panel or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage media, in addition to having a bar code scanner or other reading system, such as a cartridge memory reader or similar system mounted on the gripper assembly 20, to "read" identifying information about the data storage media.

Figure 3:
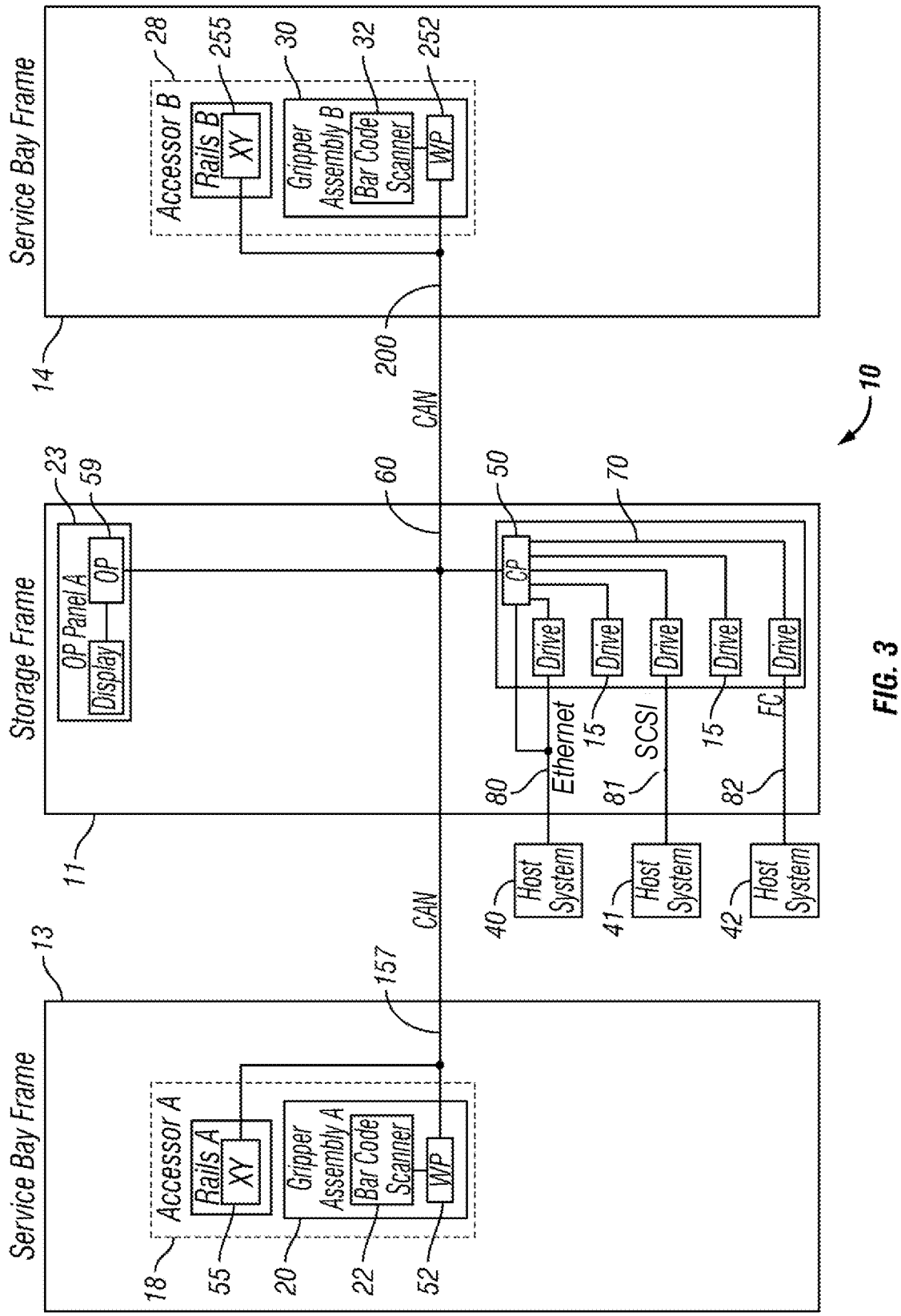
FIG. 3 is a block diagram of an automated data storage library according to one embodiment.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations.

Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a bar code scanner (e.g., reading system) to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus in different approaches, the two accessors 18, 28 may share one or more mechanical paths, they may have completely independent mechanical paths, or combinations thereof. In one example, the accessors 18, 28 may have a common horizontal rail with independent vertical rails to travel thereal-ong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on path 80, through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/ or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a communication link 70 for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA®, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42. Alternatively, the host systems 40, 41, 42 may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are intended to be Ethernet and a SCSI bus, respectively, e.g., and may serve as host connections. However, path 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover, the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
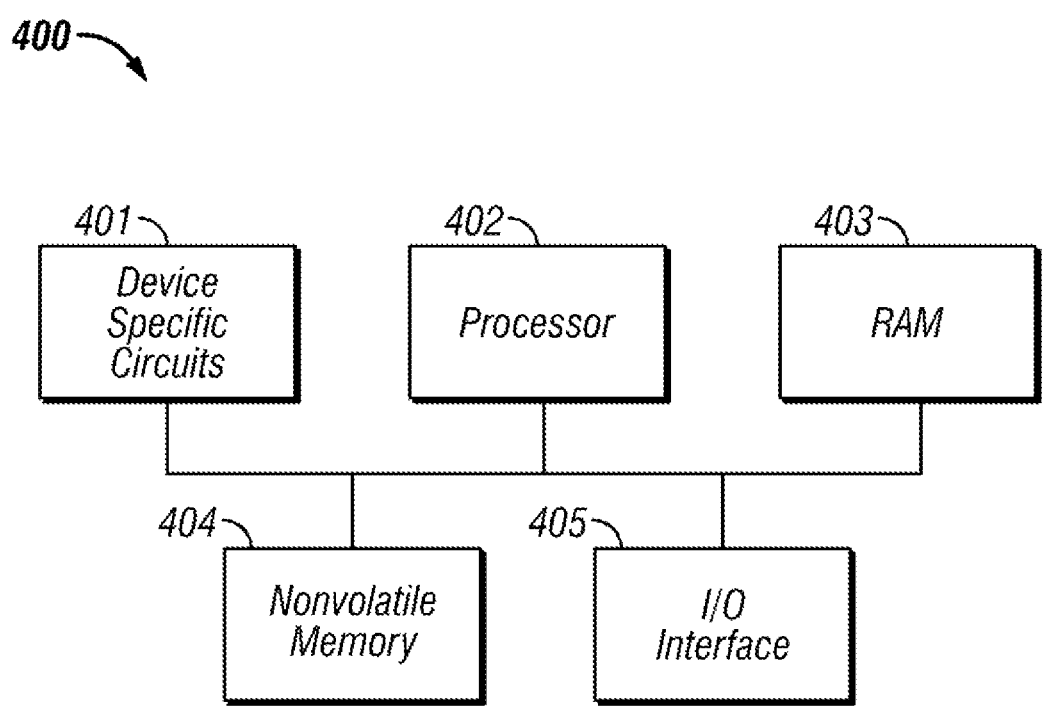
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
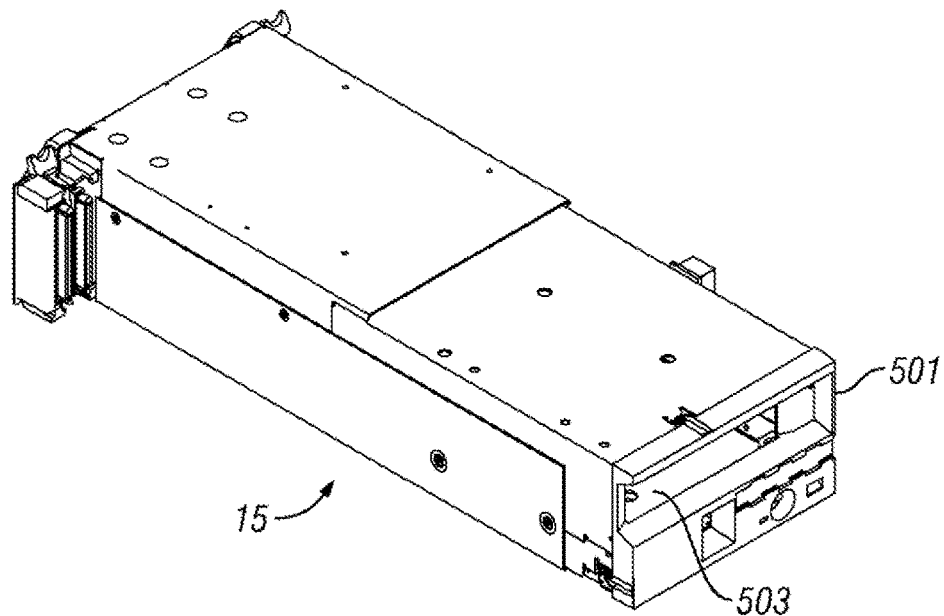
FIG. 5A is a front perspective view of a data storage drive according to one embodiment.
Figure 5B:
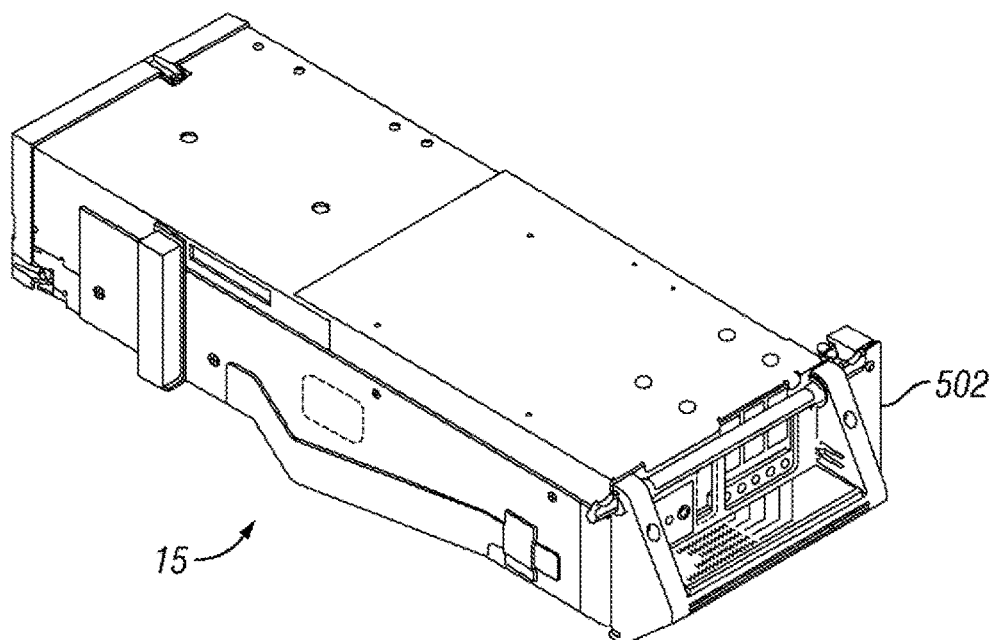
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
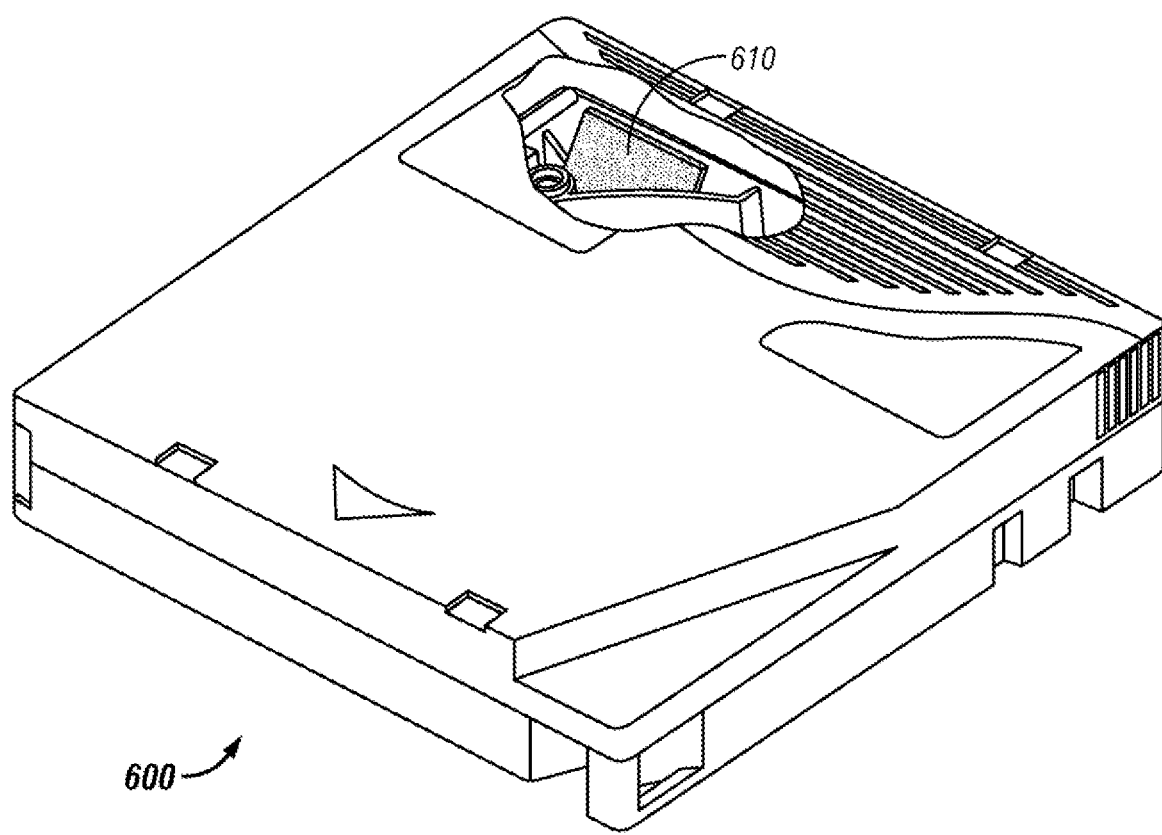
FIG. 6 is perspective view of a data storage cartridge having a cutaway portion, according to one embodiment.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, discs, etc.; electronic media, e.g., PROM, EEPROM, flash PROM, CompactFlash™, Smartmedia™, Memory Stick®, etc.; etc., or other suitable media. Moreover, an example of a data storage cartridge that is widely employed in automated data storage libraries for mass data storage is a magnetic tape cartridge in which the media is magnetic tape.

Figure 7A:
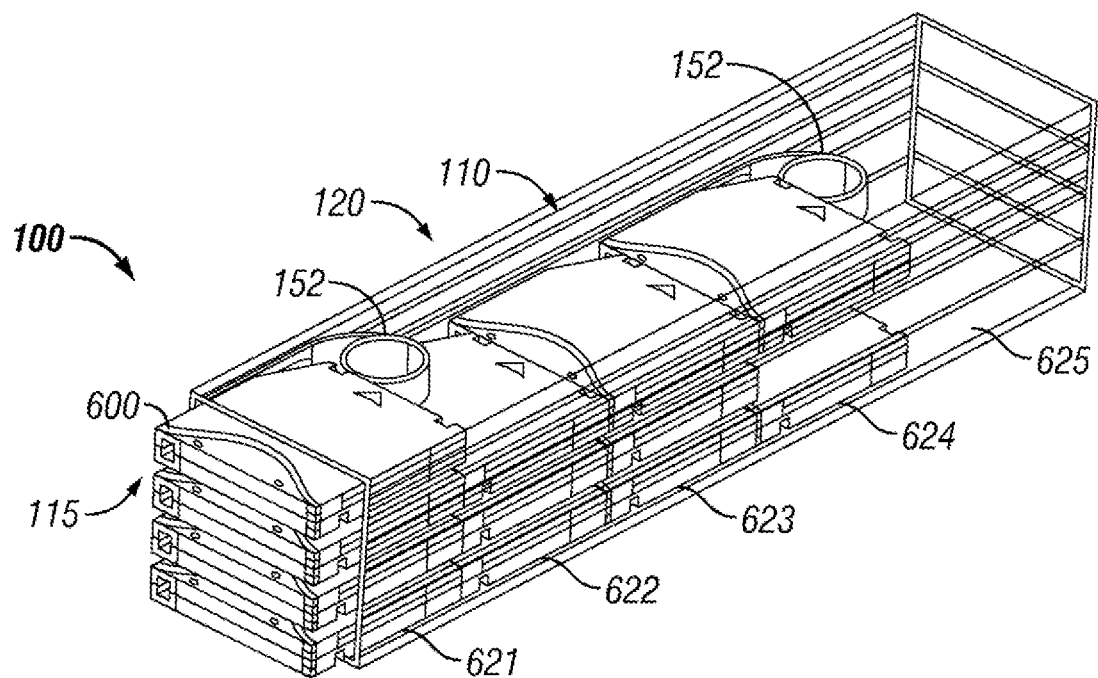
FIGS. 7A-7B are perspective views of a multi-cartridge deep slot cell according to one embodiment.
Figure 7B:
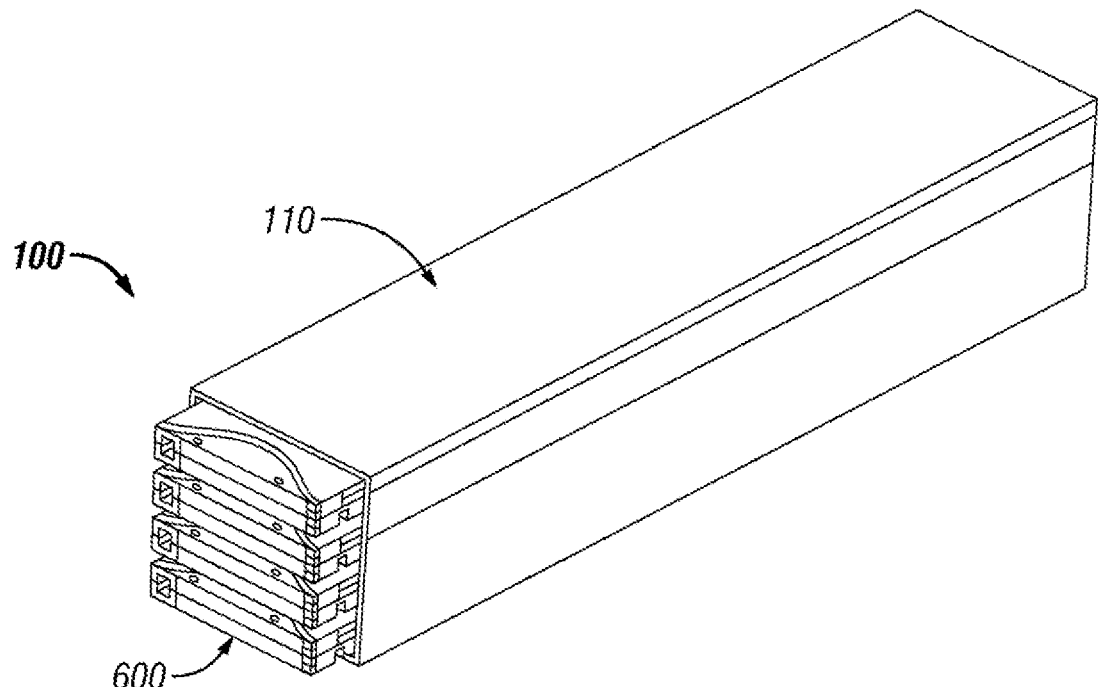

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated tape library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

Figure 8A:
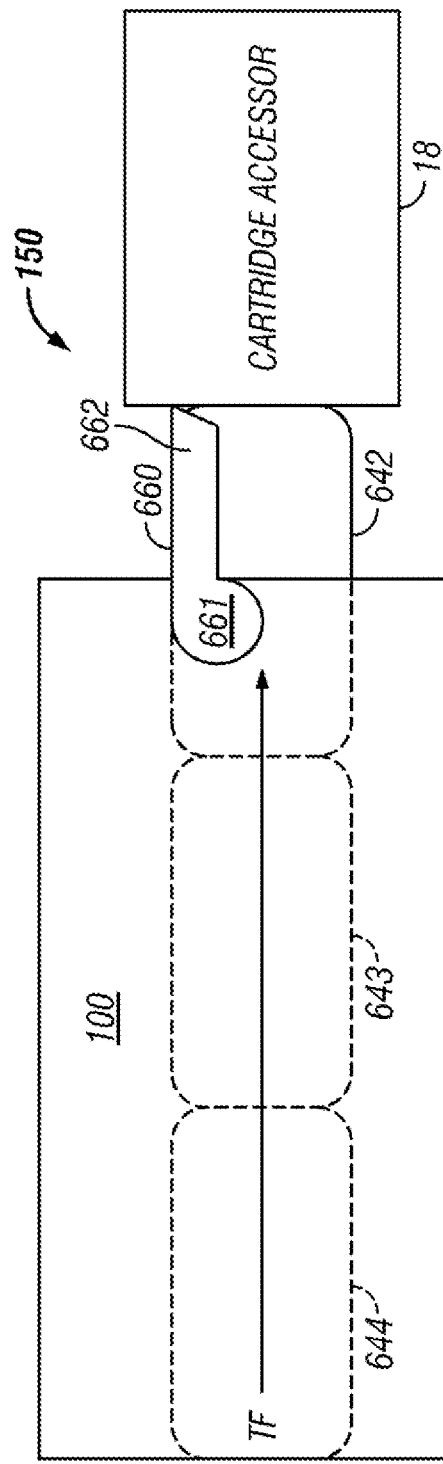

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Figure 8B:
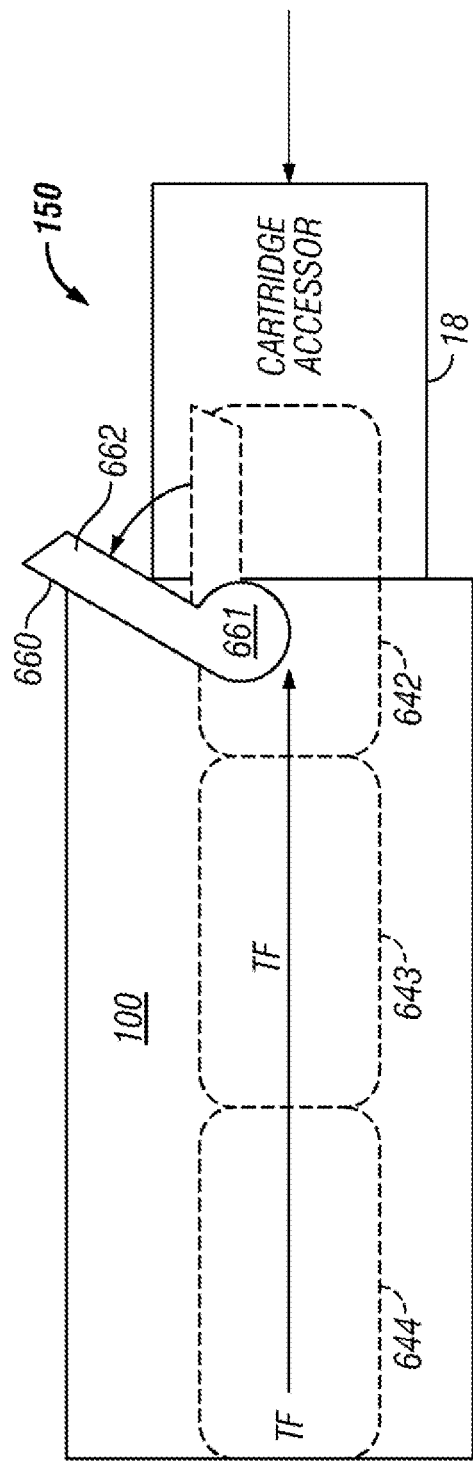

Once front storage cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

Thus, looking to various embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

Referring back to FIGS. 7A-7B, in accordance with one embodiment, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one embodiment, the single cartridge storage slots 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 9:
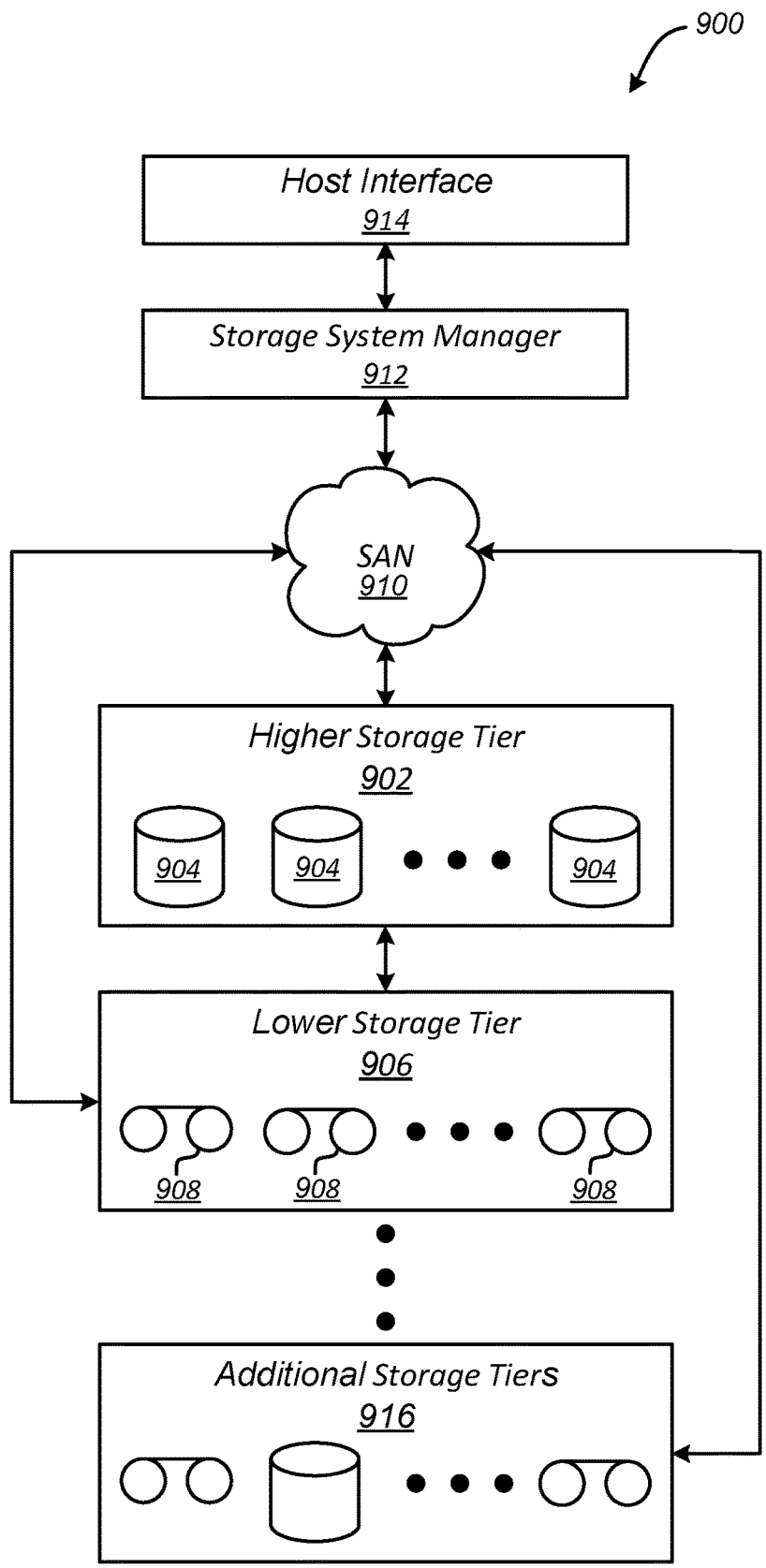
FIG. 9 is a depiction of a tiered data storage system in accordance with one embodiment.

Now referring to FIG. 9, a storage system 900 is shown according to one embodiment. Note that some of the elements shown in FIG. 9 may be implemented as hardware and/or software, according to various embodiments. In some approaches, the storage system 900 may be implemented in an automated data storage library such as that shown in FIGS. 1-2. In other approaches, an automated data storage library such as that shown in FIGS. 1-2 may be a tier of the storage system 900.

The storage system 900 may include a storage system manager 912 for communicating with a plurality of media on at least one higher storage tier 902 and at least one lower storage tier 906. The higher storage tier(s) 902 preferably may include one or more random access and/or direct access media 904, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 906 may preferably include one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Also, any of the higher storage tiers 902 and/or the lower storage tiers 906 may include some combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions. Of course, this logic may be implemented as a method on any device and/or system or as a computer program product, according to various embodiments.

As noted above, accessor nodes that store data to magnetic tape are connected to each of one or more tape drives in a tape library by a cable in some approaches. Moreover, the accessor nodes may be coupled to the tape drives directly and/or using storage network switches. As a result, each tape drive is accessible from one or multiple accessor nodes. An accessor node can utilize a tape drive it is connected to and instruct the library to mount a tape cartridge in the tape drive. Accessor nodes can also send data to the tape drive to write to the magnetic tape stored in the mounted tape cartridge. The accessor nodes may also request the tape drives to read and provide data from the magnetic tape. Furthermore, the accessor nodes are able to instruct the tape drives to unmount the tape cartridges, thereby making the magnetic tape stored therein available to other nodes.

Tape storage is considered the most economical option for storing infrequently accessed data, mainly due to the low costs and reliability that is associated therewith. However, reading data from magnetic tape efficiently may be difficult in certain practical use cases, especially when the read operations may be initiated from multiple different accessor nodes. This is particularly true for DDFSs which include accessor nodes that are connected to a shared tape storage. As a result, conventional processes involving multiplexed access to tape data from multiple nodes or multiple independent processes, even if from the same node, have lead tape drive read throughput to practically become unusable.

In sharp contrast to the aforementioned issues experienced by conventional processes, various ones of the embodiments included herein are able to successfully and efficiently implement multi-node shared access to magnetic tape resources in the context of integration of a DDFS with magnetic tape storage. To achieve these improvements, some of the approaches herein involve establishing in a storage system an automated serialized shared access from multiple accessor nodes to the tape media (e.g., which is stored in tape cartridges) of one or more tape libraries. In addition to this shared tape access functionality, some approaches establish a function for moving data (e.g., files) between a DDFS and a magnetic tape, so that the function is tolerant to node failures. This means that if a particular node fails, one or more other running nodes are able to take over the tape resources and the remaining jobs from the failed node, e.g., as will be described in further detail below.

Figure 10A:
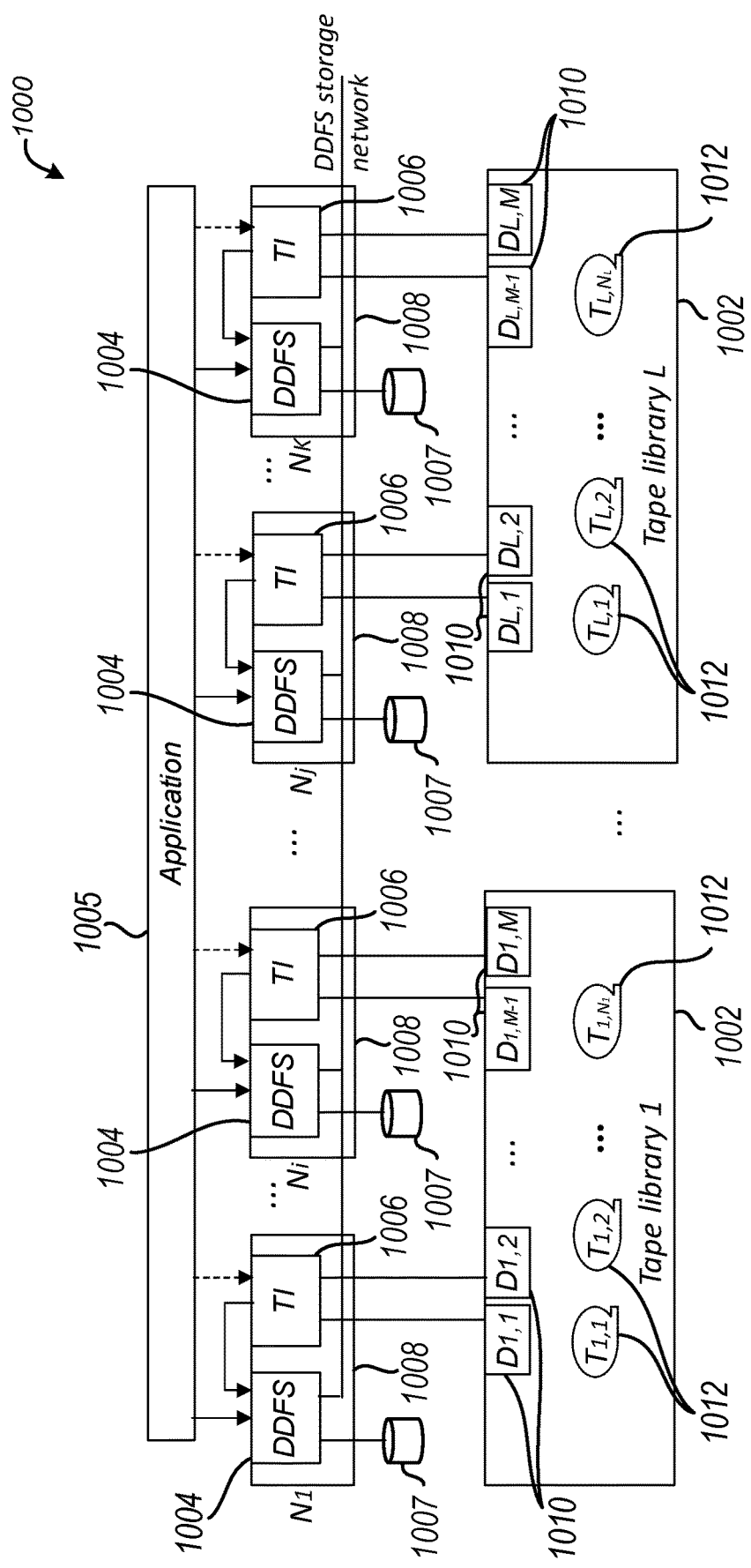
FIG. 10A is a partial representational view of a distributed data storage system in accordance with one embodiment.

Looking now to FIG. 10A, a distributed data storage system 1000 is illustrated in accordance with one embodiment. As an option, the present data storage system 1000 may be implemented in conjunction with features from any other embodiment listed herein, such as those described with reference to the other FIGS. However, such data storage system 1000 and others presented herein may be used in various applications and/or in permutations which may or may not be specifically described in the illustrative embodiments listed herein. Further, the data storage system 1000 presented herein may be used in any desired environment. Thus FIG. 10A (and the other FIGS.) may be deemed to include any possible permutation.

As shown, a number of tape libraries 1002 are integrated with DDFS 1004 by installing and activating a tape integration (TI) node 1006 having components and corresponding software at each of the DDFS accessor nodes 1008. Each of the DDFS modules 1004 are also coupled to a disk storage component 1007, e.g., such as a HDD. Moreover, an application 1005 may be running and coupled to the various modules included in each of the accessor nodes 1008, e.g., as would be appreciated by one skilled in the art after reading the present description.

The TI nodes 1006 implement the automated serialized shared access from multiple accessor nodes 1008 to the tape libraries 1002, as well as the function for moving data between disk and tape. Depending on the TI node 1006 variant, the components and/or corresponding software may be installed on all, or on a subset, of the DDFS accessor nodes 1008 that provide file system access. However, in other approaches the hardware and/or software may be installed on additional nodes that can access the overarching DDFS filesystem, but that are not used for file access by users and/or applications.

With respect to the present description, accessor nodes 1008 which are running software associated with the TI nodes 1006 are also referred to as "TI nodes", which is in no way intended to be limiting. In some approaches, at least some of these TI nodes are connected to tape resources, e.g., such as those included in the tape libraries 1002. Certain considerations regarding connectivity to DDFS and/or tape resources may also be made when selecting which nodes may serve as the TI nodes 1006. Furthermore, it should be noted that the term "tape library" as used herein is intended to refer to a logical partition (e.g., a subset of the tape drives and tape cartridges of a physical tape library). Thus, a tape library may logically span a part, or an entire physical tape library, e.g., depending on the approach.

Each TI node may register the information that is associated therewith to a globally available place, e.g., such as one file in DDFS, a table in an external database, etc. This information may be stored in the form of a TI node identification which can use hash information, e.g., such as IP+hostname for example. Each TI node will also preferably maintain a file which indicates the relative "aliveness" thereof. This file may be represented by writing a file that is named as a combination of the TI node and the respective node identification. In other approaches, a record may be created in one external database table. The file may initialize a lease (e.g., including time in seconds), and keep relevant timestamp information updated before the lease expires. In addition to continuing to read other TI member information, when a node lease has expired, the relevant record will be considered as "dead".

With continued reference to FIG. 10A, a shared serialized access to tape resources in the tape libraries 1002 from the TI nodes 1006 is achieved in some approaches by each TI node 1006 registering itself for a subset of tape resource during the period it intends to utilize the resources. In other words, a given TI node 1006 registers for a subset of tape resource in some approaches by creating a record that is globally available to the remaining TI nodes 1006. This globally available record may be in the form of a lock file that may be stored in the DDFS 1004 itself. Yet, in other approaches the globally available record may be in the form of a database record which is stored in the DDFS 1004 and/or in an external database (not shown). It should also be noted that if TI nodes 1006 are connected to the tape drives 1010 in the tape libraries 1002 directly, the TI nodes 1006 may simply register for the relevant tape cartridges 1012 themselves. However, in approaches where the TI nodes 1006 are coupled to the various tape libraries 1002 using storage network switches, a serialized shared use of the tape drives 1010 may be implemented. In such approaches, the serialized shared use of the tape drives 1010 and registration of the TI nodes 1006 for the various tape drives 1010 may be used in a similar manner as those approaches which involve registering for tape cartridges 1012 themselves.

According to an illustrative use case, which is in no way intended to limit the invention, the application 1005 may be responsible for submitting file migration requests (from DDFS to magnetic tape storage) and/or file recall requests (from magnetic tape to DDFS) to one or more of the TI nodes 1006 which are connected to the corresponding tape library in which the specified data is stored. Depending on the approach, the data may be in the form of a single file or a list of files that are to be migrated and/or recalled, e.g., depending on the requests that are received from the application 1005. Moreover, the TI node 1006 will register itself for the one or more tapes it will use to perform the received requests, e.g., by migrating the data from disk to magnetic tape and/or recalling the data from magnetic tape to disk. Thereafter, the magnetic tape may be unmounted, and the TI node 1006 will also unregister itself from the respective magnetic tapes, e.g., as will be described in further detail below.

According to another illustrative use case, which again is in no way intended to limit the invention, migration and/or recall requests may be created by an application, a user, a policy-based script, etc. The migration and/or recall requests may actually include the list of files that are to be migrated and/or recalled. Moreover, the migration and/or recall requests may be submitted by being stored as records which are globally available to all TI nodes 1006 in the system 1000, e.g., using any of the approaches described above. Accordingly, when a TI node 1006 completes processing a given request, it may check the globally available list of migration and/or recall requests to determine if there are any outstanding migration and/or recall requests. As a result, a TI node 1006 may register for a request using any of the mechanisms described herein for registering for tape library resources, and proceed with processing the requests accordingly. In some approaches, attempts from an application or user to access migrated files are intercepted by the given TI node 1006 and processed transparently.

The processes involved with registering for tape resources as well as migration and/or recall requests preferably utilize "keep-alive" timestamps, e.g., so that if a given node experiences a failure event, another one or more of the running access nodes are able to take over the tape resources and any remaining portions of the migration and/or recall requests from the failed node. It follows that the various improvements in performance experienced as a result of the approaches included herein are achieved, at least in part, as a result of enabling multi-node access, as well as use of shared magnetic tape resources. As a result, data requests and/or tape resources themselves may be overtaken by alternate TI nodes in response to one or more other TI nodes experiencing failure events.

In sharp contrast to the shortcomings experienced by conventional implementations, the improvements achieved herein allow for TI nodes to first register for globally available magnetic tape resources as well as data requests, before managing the magnetic tape resources and data requests locally. As a result, a number of the approaches included herein are suitable for integration with existing non-clustered magnetic tape software. For example, in cases involving tape integration with a DDFS using Linear Tape File System (LTFS) Data Management (DM), the local node function for scheduling file operations and managing registered resources can be reused on top of some of the approaches included herein. Moreover, the absence of centralized components that manage requests and/or resources for multiple nodes also makes the approaches introduced herein relatively simple to implement, scalable, and reliable.

Figure 10B:
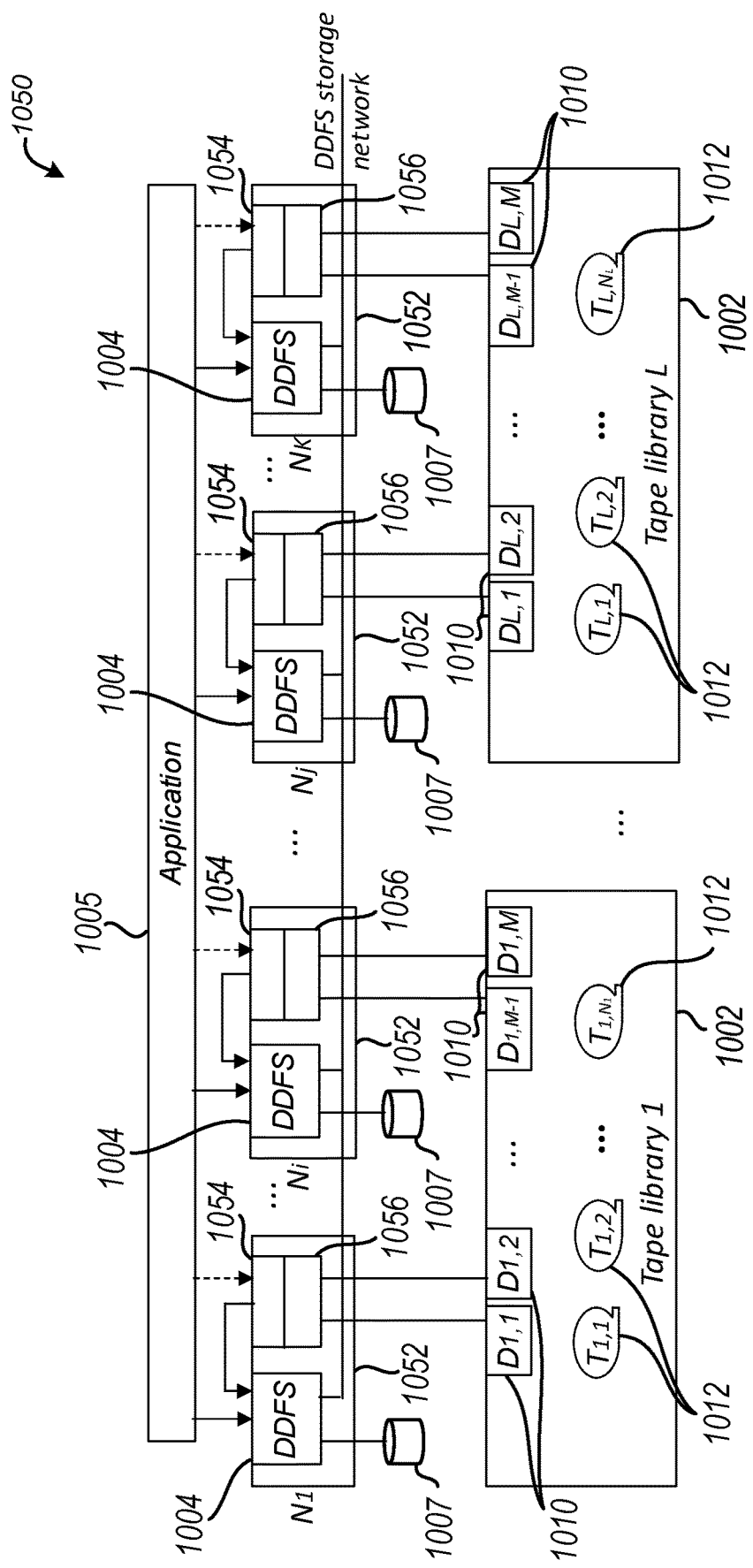
FIG. 10B is a partial representational view of a distributed data storage system in accordance with one embodiment.

Looking now to FIG. 10B, a distributed data storage system 1050 is illustrated in accordance with another embodiment. However, it should be noted that FIG. 10B illustrates variations of the embodiment of FIG. 10A, depicting several exemplary configurations in the distributed data storage system 1050. Accordingly, various components of FIG. 10B have common numbering with those of FIG. 10A.

As shown in FIG. 10B, the accessor nodes 1008 include DDFS 1004 as described above, in addition to TI nodes 1052. Each of the TI nodes 1052 in FIG. 10B are illustrated as integrating a TI module 1054 with an LTFS module 1056. Implementing the LTFS module 1056 and the corresponding processes associated therewith allows for the TI nodes 1052, which are coupled to the tape libraries 1002 via tape drives 1010, to mount a local LTFS file system that illustrates each magnetic tape in the respective tape library 1010 as a subdirectory of the LTFS file system. The LTFS module 1056 also provides function for tape mount and/or unmount operations, as well as for writing to and/or reading from a magnetic tape which is mounted in one of the tape drives 1010.

The process of registering for magnetic tape resources that are to be used by a given TI node 1052 is achieved in some approaches by creating a lock file in the DDFS 1004.

In other approaches, magnetic tape resources may be registered (e.g., reserved) by creating a record in a corresponding database table, which may be stored in the DDFS file system, or in an external database, e.g., as mentioned above. However, it should be noted that the registration information is preferably stored such that it is accessible by the other TI nodes 1052 in the distributed data storage system 1050. Approaches which implement a lock file and/or the database record preferably include "keep-alive" timestamps that the TI nodes 1052 periodically update in order to indicate that the magnetic tape resources are still being used. In some approaches, if a "keep-alive" timestamp is aged beyond a predetermined threshold before the TI node 1052 un-registers itself therefrom, another TI node 1052 in the system 1050 may be able to detect the stale connection and successfully attempt to register for the same magnetic tape resources.

In other approaches, a general procedure for leasing magnetic tape resources may be implemented at a given node and used by other TI nodes. Moreover, in situations where the TI nodes 1052 are coupled to the tape libraries 1002 via storage network switches (not shown), node registrations for the tape drives 1010 may be used in a similar way as described above for the tape cartridges 1012, e.g., as would be appreciated by one skilled in the art after reading the present description. It should also be mentioned that if a TI node 1052 registers for a given magnetic tape to migrate data, the TI node 1052 may maintain a connection with the given magnetic tape, e.g., as long as the magnetic tape is not filled to its storage capacity.

Depending on the approach, an application, a user, another storage system, etc., may submit data migration and/or recall requests by writing a list of migration and/or recall requests to predetermined DDFS folders. These DDFS folders may be dedicated for this specific purpose in some approaches, e.g., in addition to the submission time which may be included in the list name. This allows for different TI nodes to list the content of the DDFS folder after completing a previous request, e.g., in order to identify pending data requests. The TI nodes may thereby register for a pending data request using the same or a similar mechanism as described in the various approaches herein for registering for magnetic tapes. After the files listed in a request have been migrated as specified, the TI node may log the successful completion of the request, and removes the list which effectively marks it as having been completed. However, before completing the entire list of a data request, a TI node may update the list by deleting the subset of files from the list for which it completed the migration or update the header line of the file with progress information. In this way at any time the application or user is able to determine the approximate status of a submitted data request.

In some approaches, migration and/or recall requests may be created by implementing and using policy scripts that scan the DDFS and create migration lists based on file attributes. Depending on the approach, the file attributes that may be considered include, but are in no way limited to, a relative age of the data file, a relative temperature of the data included in the data file, a size of the data file, etc., and/or other user added extended attributes such as "target state: migrated". Standard solutions for leader selection and work split may be used for approaches which involve scanning large DDFSs. Moreover, these created lists may be submitted as migration and/or recall requests that TI nodes would register for and process accordingly.

Similar to situations which involve tape registrations, a node that registered for a given migration request may use and update a "keep-alive" timestamp so that in situations in which the node experiences a failure event, other nodes are able to detect the failure and overtake any unfinished portions of the migration request. Moreover, in an illustrative approach where a DDFS module provides a Portable Operating System Interface (POSIX) compliant distributed file locking function, timestamps might not be used, as locks may be removed automatically in response to experiencing a failure event for such an approach.

A migration request, in addition to a list of data files that are to be migrated, may also specify a target tape library and/or the specific magnetic tape or magnetic tape pool (e.g., if tapes are organized into pools) to migrate the data files to. With respect to the present description, a "tape pool" is a collection of magnetic tapes in a tape library, and may be implemented to collocate a subset of DDFS data into a subset of tapes. Tape pools may also be used to avoid situations of limited storage capacity, as a pool capacity can be extended by adding more magnetic tapes to it as needed.

In situations involving multiple tape libraries, a globally available mapping between the tape libraries and TI nodes connected thereto is also stored and used. However, in some situations such a globally available mapping may not be implemented, e.g., in situations where the tape library identification is used. A TI node is thereby able to register for and process only those requests that specify the tape library the TI node is connected to as the target tape library. In approaches where a migration request does not specify a target tape library, any TI node can register for the request and process it accordingly. After a TI node registers for a migration request, it then registers for a magnetic tape from the target magnetic tape pool or any magnetic tape from the tape library if the target magnetic tape and/or magnetic tape pool is not specified.

To migrate a file from the migration request list, a TI node reads the file data from DDFS and writes it to the magnetic tape as a LTFS file. Optionally, in some approaches the TI node may write the file data to magnetic tape as a range of blocks without using the general file system, e.g., as would be appreciated by one skilled in the art after reading the present description. Moreover, in approaches which implement LTFS, a tape file may be named using a randomly generated and unique identification (UUID). This UUID may then be stored in an inode of the DDFS file as desired, e.g., for referencing the tape file during recalls. Alternatively, a UUID may be stored in external databases which are at least available to (e.g., electrically coupled to) the TI nodes. A UUID is used rather than the original DDFS file name in some approaches, because DDFS files can be renamed in the general use case. Accordingly, a UUID does not have to be random but it is preferably unique for each file during the lifetime of the given file.

After copying data from DDFS to magnetic tape for a larger subset of the files from a migration request, a TI node updates the tape index (e.g., for approaches implementing LTFS), and synchronizes the tape index to the magnetic tape. The TI node may also mark the files as having been migrated e.g., by adding an extended attribute to the inode. In some approaches, the TI node also stubs (e.g., truncates) the file data in DDFS, e.g., by removing the disk data, thereby leaving only file inode with the added migration metadata, such as the UUID, corresponding status information, etc. If an external database is used rather than inodes to store migration metadata, the inode may also be removed from the DDFS, but this is in no way required.

In some approaches, a pre-migration option may be implemented for migration to not remove file data from disk, thereby leaving the data in a pre-migrated state such that the data is stored on both disk and tape. In other words, a later migration request for pre-migrated files will not involve moving data, but rather stub the files in DDFS. In such situations, a check may be implemented to not mount a magnetic tape if all of the files on the corresponding list have already been pre-migrated.

After completing a migration request, a TI node removes the request from the globally available records of pending requests. The TI node may then check if there are any pending requests that may be processed using the currently mounted magnetic tape, e.g., in order to minimize the number of tape unmounts and/or mounts that are performed. If there are no pending requests that may be processed as such, the TI node may also check for other requests it may be able to process. In response to identifying such a request, the TI node may register for the request, after which the TI node unmounts the currently mounted magnetic tape and subsequently unregisters from it. If a node cannot register for a magnetic tape involved with processing a request, it may also unregister from the request or it does not register for it in the first place, e.g., so that another node which might already have the target tape mounted is able to register for the request and process it.

In an advanced use case, which is in no way intended to limit the invention, multiple magnetic tape copies may have been created in different tape libraries. In these situations, a migration request is registered for, and processed by, two different TI nodes, each of the nodes being connected to a different target tape library. One of the TI nodes preferably registers for the first copy, in addition to providing its relevant tape library information in situations where the information has not already been specified in the request. The other TI node can thereby register for the second copy. Each of the two TI nodes update the target tape library and target tape information as well as status information in the DDFS inode (or external databases) separately for their respective copy. The node that completes data migration first marks it in the request registration record, and the node that completes second stubs (e.g., truncates) the disk files accordingly.

A recall request is preferably first registered for and pre-processed by a TI node so to split it into per target tape sub-requests. If these are files that have been migrated together, the data related to one recall request is on one more magnetic tapes, so there will be one or more sub-requests. This process effectively makes use of tape resources in a more efficient manner because less tape drive resources are spent performing tape mounts and/or unmounts. After sub-requests are created, different TI nodes can register for a given sub-request and process it accordingly. The target tape library and target tape information is available from the DDFS file inode, or from an external database, e.g., depending on what is used for storing the migration metadata.

Further processing of a recall sub-request may implement any of the approaches described above with respect to the processing of a migration request. However, in some approaches, only the data is copied in the opposite direction and DDFS file statuses are updated to pre-migrated state. Updating the file statuses as such indicates that the data is available on both disk and magnetic tape. Moreover, approaches which involve multiple magnetic tape copies of a DDFS file are stored at migration, any of the tape copies may be used for recalling the data to disk, e.g., such as the first copy which may be recalled by default. In situations where the first-copy tape is not available, the recall sub-request can be converted, e.g., by the TI node that attempted to process it. The sub-request may be converted into a recall sub-request corresponding to the second-copy tape in some approaches. The TI node may then unregister itself from the sub-request so that it can be registered for, and processed, by a TI node that is connected to the tape library of the second-copy tape. According to some approaches, this process is referred to as a recall tape failover.

Upon a query from an application or a user to check if a migration or recall request has been completed, a TI component is able to look up the request records to see if a request of interest has already been registered by a TI node (e.g., is being processed), not yet registered (e.g., is still pending), or deleted (e.g., already completed). Optionally, additional and/or more detailed progress information may be queried from the node registered to process the given request. Moreover, the status of an individual file can be checked by a TI node upon a query from application, user, storage system, etc., by checking the file status information stored in the respective file inode.

As alluded to above, if a TI node connected to a given tape library experiences a failure event, the magnetic tape mounted in a tape drive that is coupled to the failed TI node may be unmounted from another TI node which is also coupled to the same tape library. The unmount operation may be achieved by the alternative TI node either issuing an operation for that magnetic tape (e.g., write to a dummy file in the tape root directory), or by using the tape library command to unmount the tape. This process may vary depending on the implementation details of the particular tape library. In response to unmounting the magnetic tape, it can be registered for, and used by, another node which is connected to the same tape library. This is particularly desirable when processing recall operations in case there is only one magnetic tape copy and the node that mounted that one copy experienced a failure event. However, the ability to unmount the is also useful in situations where the first-copy tape is not available and a node mounting the second-copy tape fails.

It should also be noted that in situations where DDFS inodes are used to store target magnetic tape information, DDFS node failure events can be tolerated if the DDFS stores metadata in a way that tolerates node failures, e.g., where the various inodes are still accessible. However, if an external database is used to store file names and/or target location information, the DDFS disk storage is preferably able to continue operating even in response to experiencing node failures in order to allow recalling the data from magnetic tape.

For the above described DDFS integration implementing the TI module in addition to the LTFS module (e.g., see FIG. 10B), TI nodes can be a subset of DDFS nodes. In some approaches the TI nodes may serve as newly added local nodes that have access to DDFS. In still other approaches, the TI nodes may be located remote with respect to the DDFS node, despite being coupled thereto, e.g., such that requests, commands, data, etc., may be transferred therebetween. Each TI node is also preferably connected to a tape library. The configuration illustrated in FIG. 10B assumes a simplified implementation of the TI node that provides migration and explicit recall functions but not the transparent recall. The application either remains aware of, or may check, the file state and is responsible for issuing a recall request before accessing a file (e.g., for a read operation) as well as taking care to not overwrite migrated files, whether inode stubs or external databases are used for storing migrated file metadata.

Figure 10C:
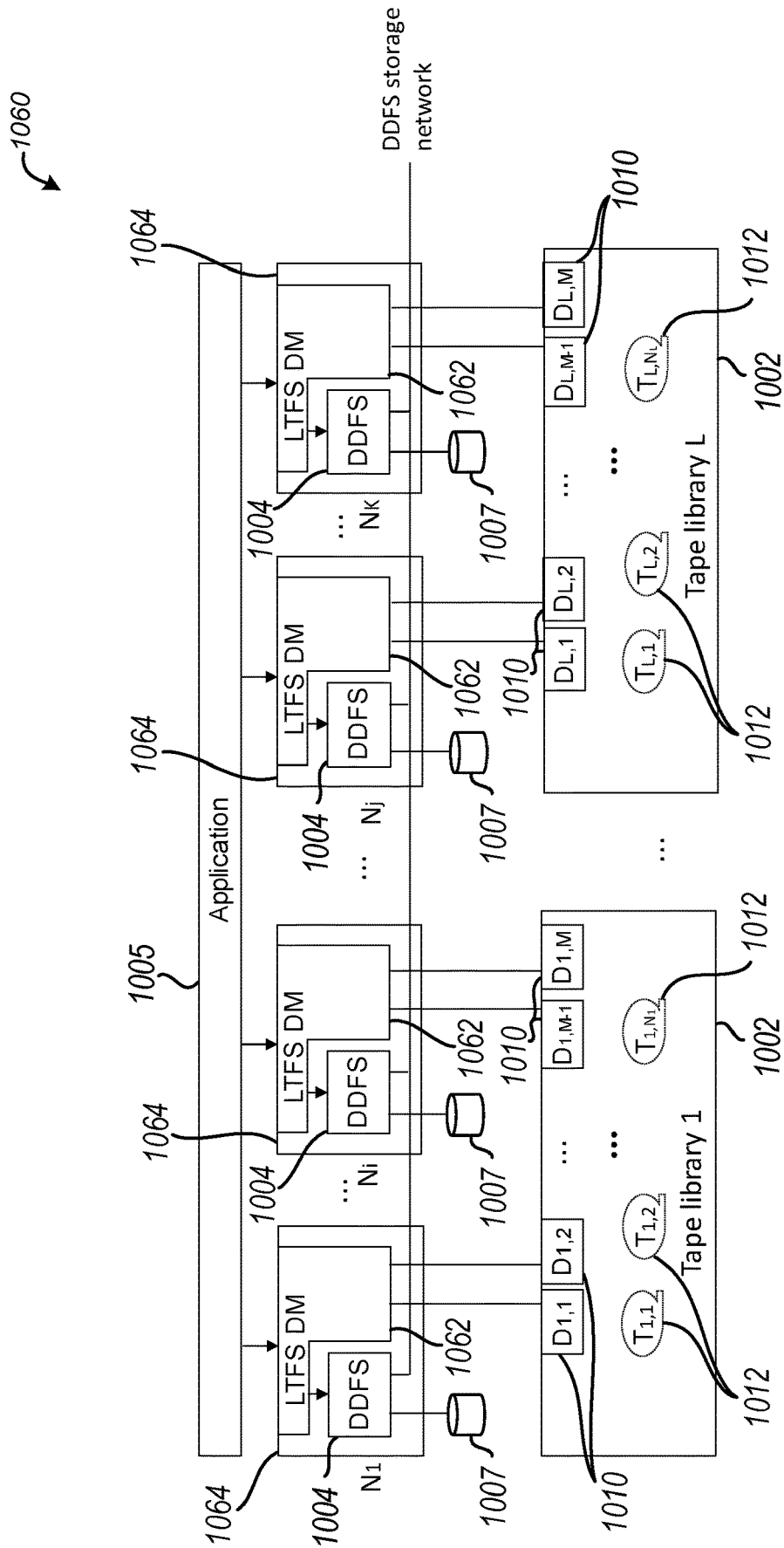
FIG. 10C is a partial representational view of a distributed data storage system in accordance with one embodiment.

Referring now to FIG. 10C, a distributed data storage system 1060 is illustrated in accordance with another embodiment. However, it should be noted that FIG. 10C illustrates variations of the embodiment of FIG. 10A, depicting several exemplary configurations in the distributed data storage system 1060. Accordingly, various components of FIG. 10C have common numbering with those of FIG. 10A.

As shown in FIG. 10C, the data storage system 1060 implements a LTFS DM module 1062 in each of the TI nodes 1064. The local LTFS DM modules 1062 are able to schedule file operations and/or manage registered tape library resources according to any of the approaches described herein, e.g., including the reuse of LTFS DM function that supports transparent recalls for migrated files. With the system architecture illustrated in FIG. 10C, the filesystem operations received from applications and/or users are performed using the LTFS DM modules 1062.

According to an illustrative approach, the LTFS DM modules 1062 may even implement a LTFS DM fuse layer, e.g., as would be appreciated by one skilled in the art after reading the present description. For instance, the LTFS DM fuse layer is able to expose the DDFS name space to applications and/or users via its own mount point. There is also an LTFS DM modules 1062 backend layer in some approaches that is able to migrate data between DDFS 1004 and LTFS DM modules 1062.

According to an example, which is in no way intended to limit the invention, applications and/or users may expect to see a DDFS namespace under /mnt/ddfs. Thus, DDFS is mounted under a so-called "hidden directory" /mnt/.ddfs, and LTFS is mounted under a hidden directory /mnt/.ltfs, while LTFS DM is mounted under /mnt/ddfs which is exposed to the applications and/or users. With respect to the present description, the name of a "hidden directory" starts with a dot and each are treated as being hidden, e.g., the ls command does not display them unless the -a flag (ls -a) is used. Moreover, users and/or applications preferably do not (but theoretically still could) write to these file systems directly.

According to another implementation example, LTFS DM is mounted under /mnt/ddfs and the DDFS is mounted under /mnt/ddfs/.ddfs so that the fuse layer of LTFS DM can intercept and prevent writing to the DDFS. In other words, the distributed disk file system is mounted under a LTFS DM fuse layer, e.g., such that the LTFS DM fuse layer is able to selectively prevent direct access to the distributed disk file system.

Similar steps may also be taken for LTFS if desired. Moreover a LTFS DM process may open a file descriptor for /mnt/ddfs/.ddfs and use lazy unmount for /mnt/ddfs/.ddfs, so that the fuse layer of LTFS DM can continue writing and reading data to and from DDFS. However, in situations where the LTFS DM process terminates, DDFS is automatically unmounted to a clean state. Each node being used for access by applications and/or users runs at least the fuse layer of LTFS DM (access nodes), and each node connected to a tape library runs at least the LTFS DM backend layer (tape nodes). All the access and tape nodes mount the underlaying DDFS (or at least have read and write access to DDFS). It should be noted that the name used herein for such a distributed disk and tape filesystem available under the same mount point on all the access nodes, under /mnt/ddfs in the above examples, is a "distributed managed file system" (DMFS).

In order to perform a file write operation, the LTFS DM fuse layer saves the file data into DDFS (e.g., to disk) to avoid experiencing tape latencies. Filesystem operations performed thereafter on the file are also preferably performed through the LTFS DM fuse layer. The underlaying processing is also transparent to user, whether the file data is on disk (resident) or on tape (migrated). In other words, in situations where there is a read request to a migrated file, the request is blocked by the LTFS DM fuse layer until it is recalled from LTFS to DDFS by LTFS DM backend layer. Thereafter, the request is unblocked and transparently (although with some latency) served to the requesting application and/or user. DDFS thereby effectively serves as a disk cache of DMFS.

Furthermore, in some approaches the LTFS DM fuse layer is enhanced, e.g., in order to support transparent recall. The LTFS DM fuse layer may be enhanced using as the base LTFS DM originally developed for single node disk and tape integration, e.g., so that it routes each transparent recall to an appropriate node connected to the tape library that has the respective tape. Transparent recall routing and overall processing are explained for a typical usage scenario as follows.

For typical transparent recall routing and overall processing, considered is a DMFS storage. A file may be stored via an access node (e.g., "node 1"), and LTFS DM fuse layer of node 1 stores the file to the underlying DDFS. In this example DMFS, DDFS, and LTFS are all mounted on all nodes which include both access and tape nodes. In such a multi-library configuration, each tape node additionally receives (e.g., via LTFS) the information regarding the identification of the tape library the given node is connected to, and stores that information into DDFS, or into a database available to all the access nodes. This information is stored in the form of the mapping between a tape library and the nodes attached to it, thereby making this mapping available to each of the access nodes.

The file is then migrated to a magnetic tape via a tape node "node j" that is connected to a second tape library "tape library 2". As a part of migration processing, node j writes the target tape library and target tape information into the file inode in DDFS. The file is then accessed for read on yet another node "node i", which is connected to library "tape library 1".

The LTFS DM fuse layer of node i blocks the read requests, reads the file migration information (status and target tape library and tape) from the file inode in DDFS, and finds out the file is migrated and needs a recall. The LTFS DM fuse layer of node i also checks the target tape/library information and finds that the file is written to tape 1 at tape library 2. The LTFS DM fuse layer also checks in the tape registration if there is a node registered to tape 1 at tape library 2, and if there is one, it connects to the LTFS DM backend of that node. Otherwise, the LTFS DM fuse layer checks the tape library to tape nodes mapping and connects to the LTFS DM backend of any tape node connected to that tape library 2, and instructs the LTFS DM backend (e.g., of "node k") to recall the file, all this while the file read request is still blocked.

Assuming the target tape was not registered to by any node, including node k, LTFS DM backend of node k tries to register for the target tape. Registering for a tape before using and managing it, instead of managing all the tape library tapes reported by LTFS, is another enhancement to LTFS DM on top of the original LTFS DM used for single node disk and tape integration. Assuming the registration is successful, the LTFS DM backend of node k continues processing the request. Otherwise, in response to determining that the target tape was registered to by another in the meantime, the backend would return an error code so that LTFS DM fuse layer of node i can retry finding and connecting to the appropriate node. LTFS DM backend of node k queues, schedules, and executes a job that reads the file data from the target tape and writes it to DDFS, updates the file state in the file inode, and returns the control to the LTFS DM fuse of node i. LTFS DM fuse of node i then unblocks the read and serves it by reading the file data from DDFS mount on node i and supplying it to the application.

An implementation variant which may be experienced in some situations involves the situation where access nodes cache the mappings between tape libraries and tape nodes, and update the cache information from the shared location as part of error processing that gets triggered if node mapping and/or status changes. A further variant is to cache drive and/or tape registrations as well. In yet another implementation variant node i and node j communicate the events related to the triggering and processing the transparent recall for a file via a globally accessible queue of such requests, e.g., created per node or per group of nodes connected to the corresponding tape library and capable to perform the transparent recall of the file.

Yet another implementation variant of the embodiments included herein involve enhancing TI nodes with a function for selecting a leader. The leader may then check nodes statuses and assign the migration and recall requests to the other nodes. The leader node can also be used to scan DDFS based on metadata (e.g., such as file age, last access time, user-added metadata, etc.) in order to create migration or recall lists. The leader node might split a migration list into sub-lists based on the number of TI nodes and submit the sub-lists as migration requests, or it can split a recall scan list into sub-lists based on target tape and submit those as recall requests. Keep-alive timestamps are updated by the leader and by TI nodes, and checked by the leader node to detect failing nodes and re-assign requests (e.g., jobs). TI nodes also check the timestamp updated by the leader node to detect the presence of the leader node. If a TI node detects the leader node is absent, it may assume the role of the leader node.

In some approaches, the leader selection process may involve each TI node registering itself for leader, e.g., in order to perform the migration job list dispatch. The registration process takes place in some approaches by acquiring a file lock on DDFS. Moreover, the first TI node that acquired the lock will be treated as the leader node. The leader node will update the information to a globally available place (e.g., such as a file at DDFS, an external database table, etc.), and periodically refreshes the lease by updating the resource registration timestamp. Migration jobs involve the leader scanning the DDFS file directory, e.g., in order to select a number of files as migration candidates. In some approaches, this selection is performed with respect to a temporal order. The leader node may also know how many TI node members there are by member registration record. Accordingly, the migration files list is divided so each member will have one "sub-list" registered thereto. The sub-lists will also be written to a file in DDFS and/or in a database table, e.g., for redundancy purposes.

Figure 11A:
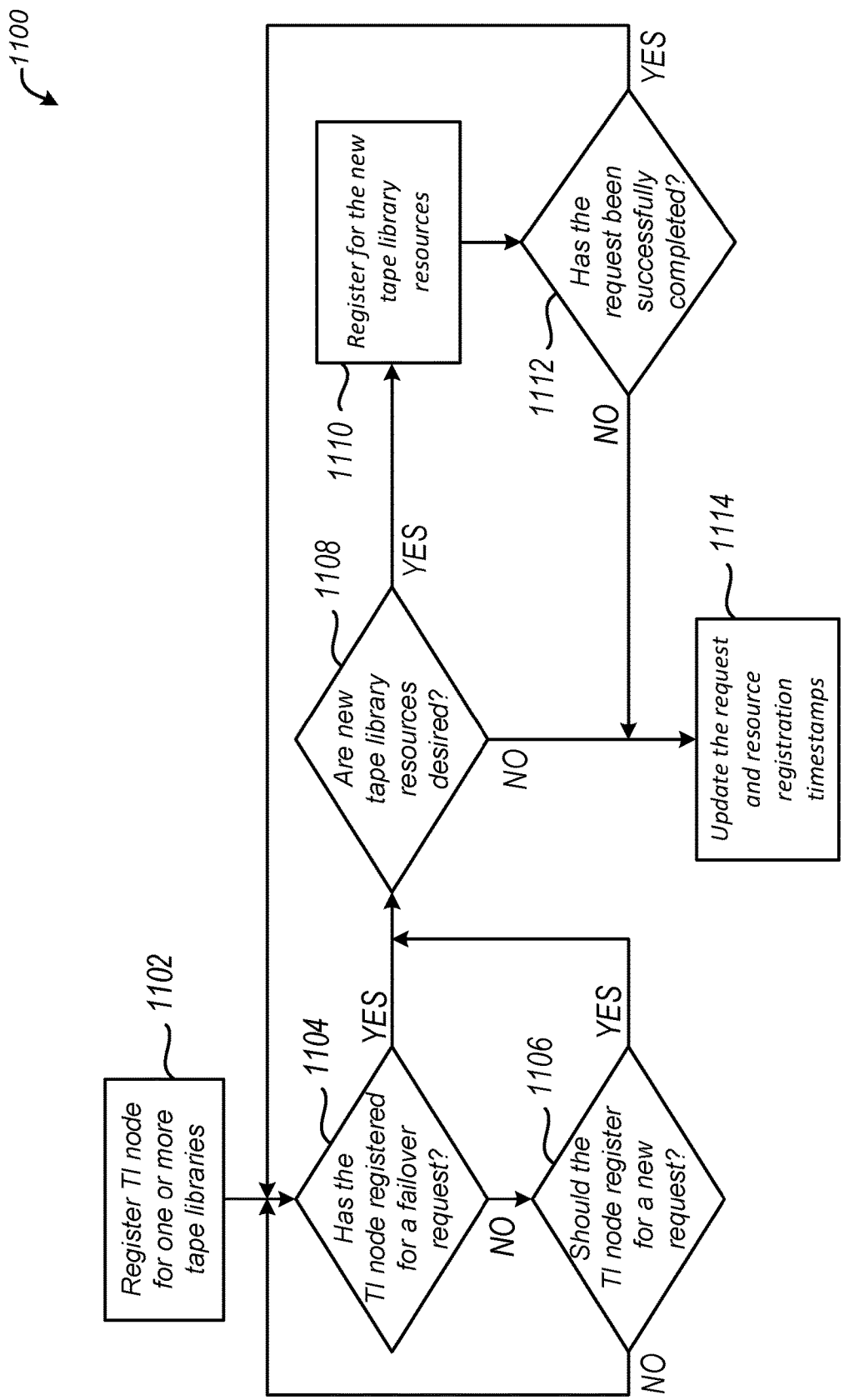
FIG. 11A is a flowchart of a method in accordance with one embodiment.
Figure 11B:
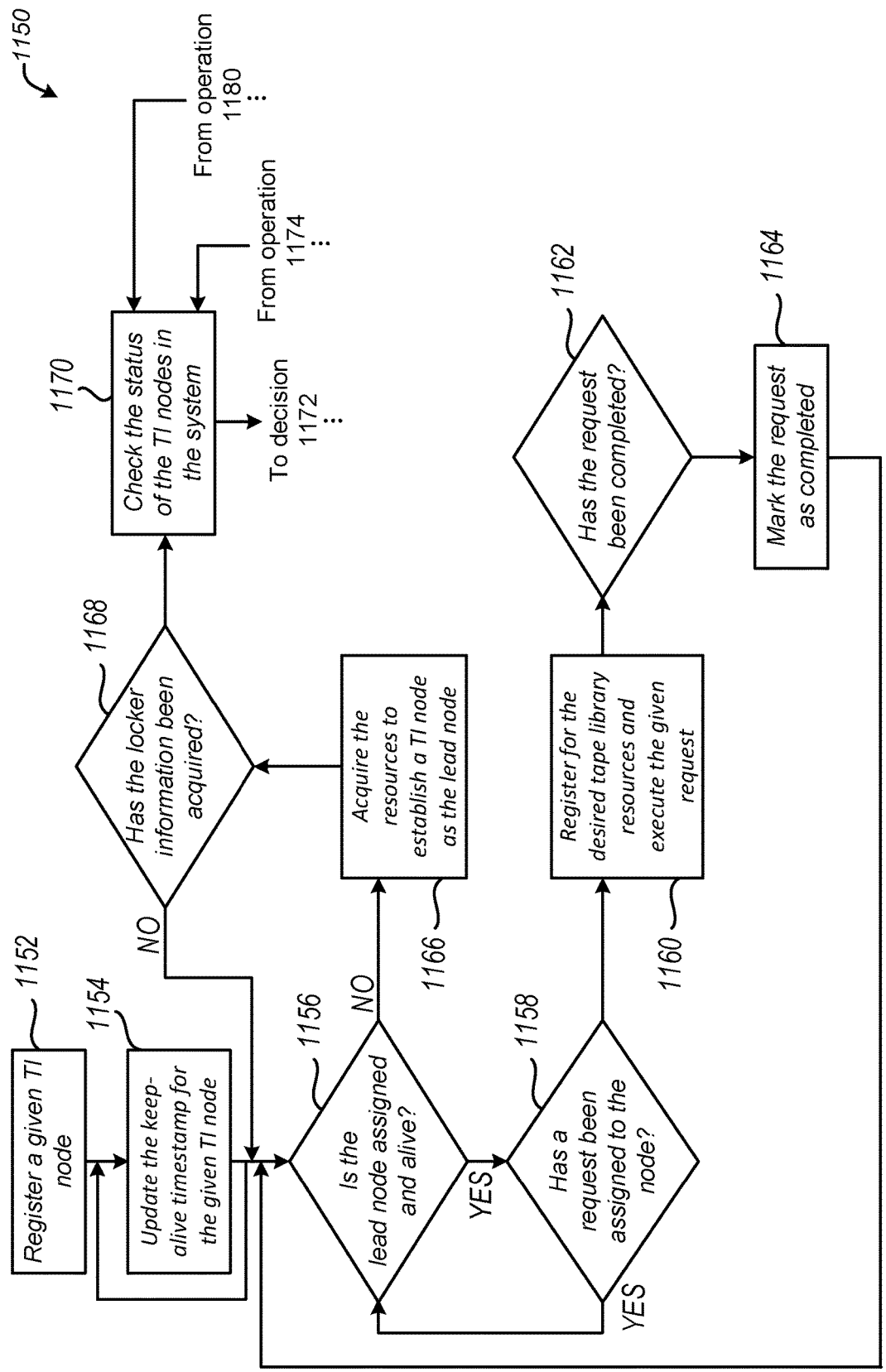
FIG. 11B is a flowchart of a method in accordance with one embodiment.
Figure 11B:
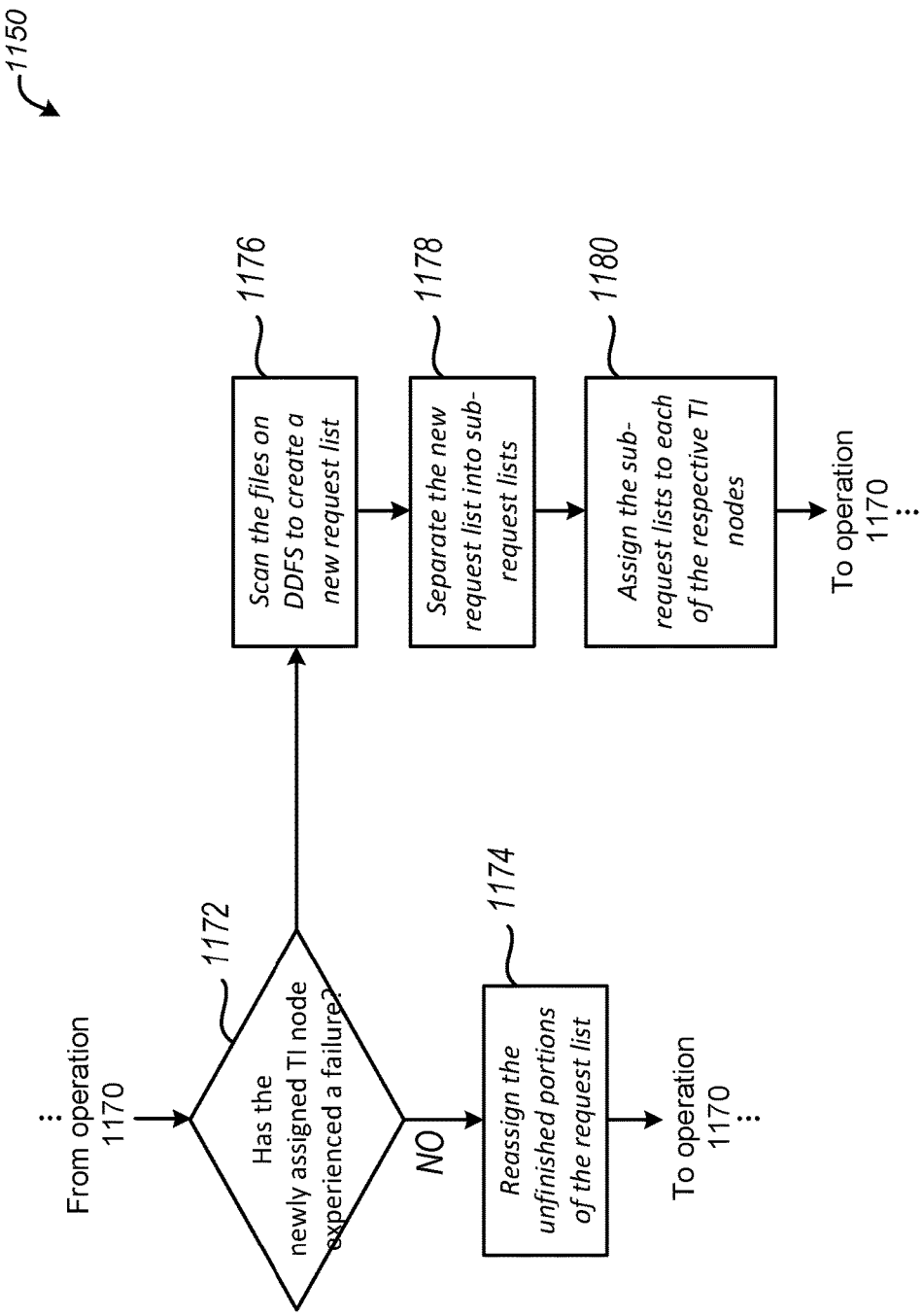

Referring momentarily to FIGS. 11A-11B, flowcharts of methods 1100, 1150 are illustrated in accordance with two embodiments. As shown, method 1100 involves registering for requests to process as well as tape library resources to use. Moreover, method 1100 involves selecting a leader node for scanning DDFS and assigning requests (e.g., jobs) is illustrated in accordance with one embodiment. The methods 1100, 1150 may each be performed in accordance with the present invention in any of the environments depicted in FIGS. 1-10C, among others, in various embodiments. Of course, more or less operations than those specifically described in FIGS. 11A-11B may be included in methods 1100, 1150, as would be understood by one of skill in the art upon reading the present descriptions.

Each of the steps of the methods 1100, 1150 may be performed by any suitable component of the operating environment. For example, in various embodiments, the methods 1100, 1150 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the methods 1100, 1150. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 11A, operation 1102 of method 1100 includes registering a given TI node for one or more tape libraries, which updates the globally available mapping between the tape libraries and TI nodes. The given TI node that is registered may be a next node in the system, selected randomly, selected by a user, etc. The TI node then tries to register itself for processing one or multiple migration or recall requests related to a tape library. Moreover, decision 1104 determines whether the TI node has registered for a failover request (e.g., a job). In response to determining that the TI node has registered for a failover request, method 1100 proceeds to decision 1106 which includes determining whether the TI node should register for a new request (e.g., job). In response to determining that the TI node should not register for a new request, method 1100 returns to decision 1104, e.g., such that it may be repeated.

However, in response to determining that TI node should register for a new request, method 1100 proceeds to decision 1108 which includes determining whether new tape library resources are desired. In response to determining that new tape library resources are desired, method 1100 proceeds to operation 1110 which includes registering for the new tape library resources. In preferred approaches, a timestamp of the registration is also noted. From operation 1110, method 1100 proceeds to decision 1112 which includes determining whether the request (e.g., job) has been successfully completed. In response to determining that the request has been successfully completed, method 1100 returns to decision 1104, e.g., such that it may be repeated as described above. However, in response to determining that request has not been successfully completed yet, method 1100 proceeds to operation 1114 which includes updating the request and resource registration timestamps. Similarly, method 1100 proceeds to operation 1114 in response to determining that new tape library resources are not desired.

Looking now to FIG. 11B, method 1150 includes steps performed by a TI node when a lead node is configured to be used, in accordance with one embodiment. The operation 1152 of method 1150 includes registering a given TI node as connected to, and for working with, one or more tape libraries. Moreover, operation 1154 includes updating the keep-alive timestamp for the given TI node before proceeding to decision 1156. There, decision 1156 includes determining whether the "lead node" is assigned and alive. In response to determining that a lead node is currently assigned and alive, method 1150 proceeds to decision 1158 which includes determining whether a request (e.g., job) has been assigned to the node. It should also be noted that method 1150 may periodically update the keep-alive timestamp over time, and therefore operation 1154 is illustrated as being repeated, e.g., as desired.

In response to determining that a request has been assigned to the node, method 1150 proceeds to operation 1160 which includes registering for the desired tape library resources and executing the given request. Moreover, the keep-alive time for the given TI node is also preferably updated before proceeding to decision 1162. There, decision 1162 includes determining whether the request has finished. In response to determining that the request has not finished, method 1150 proceeds to operation 1164 for marking the request as completed, which may involve deleting it from the list of requests.

From operation 1164, the TI node method 1150 returns to check the condition of the lead node again in decision 1156. Looking again to decision 1156, in response to determining that the leader is not available and/or not alive, method 1150 proceeds to operation 1166 which includes acquiring the locker on DDFS to become the leader TI node. In other word, operation 1166 includes acquiring the resources to establish a TI node as the lead node. In some approaches, the resources associated with establishing the TI node as the lead node include a locker and/or locker information, e.g., as described above. Decision 1168 determines whether the locker information has been acquired. In response to determining that the locker information has not been acquired, method 1150 returns to decision 1156. However, in response to determining that the locker information has been acquired, method 1150 proceeds to operation 1170 which includes checking the status of all TI nodes in the system. From there, method 1150 proceeds to decision 1172 which determines whether the newly assigned TI node has experienced a failure event. In response to determining that the TI node has gone offline, operation 1174 includes reassigning the unfinished portions of the request (job) list if applicable before returning to operation 1170.

Looking again to decision 1172, method 1150 proceeds to operation 1176 in response to determining that the TI node has gone offline. There, operation 1176 includes scanning the files on DDFS to create a new request list. Alternatively, the file list generated by the application may be read to create the new request list (job list). Moreover, operation 1178 includes separating the new request list into sub-request lists, e.g., according to the number of TI nodes there are. Furthermore, operation 1180 includes assigning the sub-request lists to each of the respective TI nodes before returning to operation 1170.

An alternative option to using tape registrations, e.g., as described in FIGS. 11A-11B involves assigning tapes manually to each TI node. However, in such approaches the failover procedure is not automated. Further alternative approaches involve assigning primary and/or secondary nodes (and potentially further failover nodes) for each magnetic tape and use registrations to track active (e.g., not failed) nodes.

Figure 12:
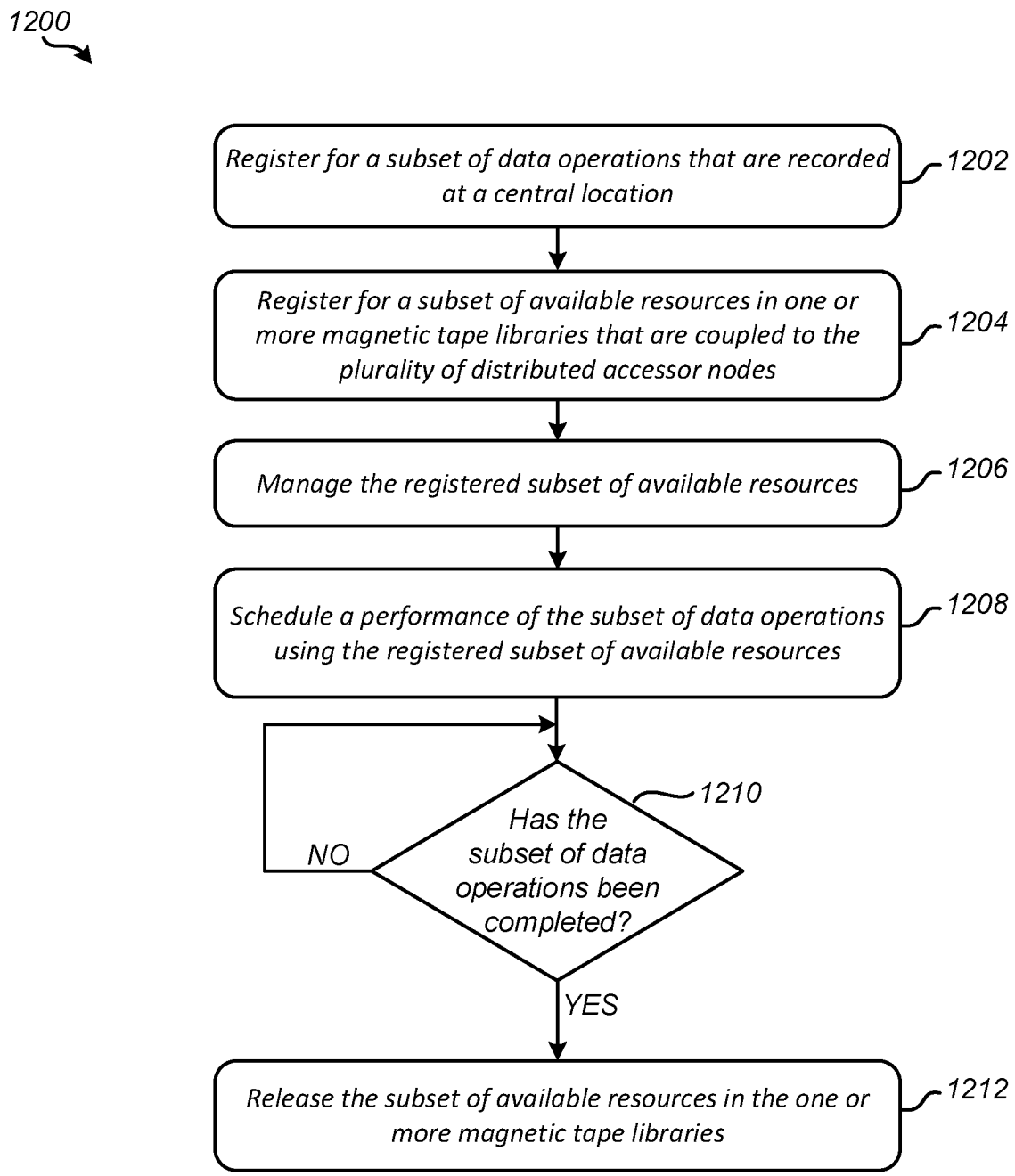
FIG. 12 is a flowchart of a method in accordance with one embodiment.

Referring now to FIG. 12, a method 1200 for integrating magnetic tape storage with a distributed disk file system is illustrated in accordance with yet another embodiment. The method 1200 may be performed in accordance with the present invention in any of the environments depicted in FIGS. 1-11B, among others, in various embodiments. Of course, more or less operations than those specifically described in FIG. 12 may be included in method 1200, as would be understood by one of skill in the art upon reading the present descriptions.

Each of the steps of the method 1200 may be performed by any suitable component of the operating environment. For example, it is preferred that the processes included in method 1200 are performed by one of the DDFS accessor nodes included in a distributed data storage system (e.g., see 1008 of FIG. 10A, 1052 of FIG. 10B, and 1064 of FIG. 10C). According to a more specific example, various ones of the processes included in method 1200 may be performed by a TI node and/or a DDFS node (e.g., see 1006 and 1004 of FIG. 10A, respectively).

However, in various other embodiments, the method 1200 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 12, operation 1202 of method 1200 includes registering for a subset of data operations that are recorded (e.g., accumulated) at a central location. As mentioned above, the processes in method 1200 may be performed by a given accessor node of a distributed data storage system, e.g., such as those illustrated in FIGS. 10A-10C. Thus, data operations including data migration and/or data recall requests are received from running applications, users, other storage systems, etc., and are preferably accumulated in a central location which is accessible by a plurality of accessor nodes. Thus, by registering for a subset of the plurality of data operations which have been accumulated, operation 1202 is able to assign specific data operations to a specific accessor node. It also follows that the central location that the data operations are accumulated is preferably coupled to a plurality of distributed accessor nodes. Depending on the approach, the central storage location may be physically and/or wirelessly electrically coupled to the various accessor nodes, e.g., as would be appreciated by one skilled in the art after reading the present description. For instance, the central location may be coupled to each of the distributed accessor nodes using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description.

Proceeding to operation 1204, here method 1200 includes registering for a subset of available resources in one or more magnetic tape libraries that are coupled to the plurality of distributed accessor nodes. Again, by registering for specific resources (e.g., magnetic tape cartridges, tape drives, accessors, etc.) in one or more specific tape libraries, the given accessor node is able to coordinate with a number of other accessor nodes which are satisfying other portions of the received data operation requests using other portions of the resources in the same one or more tape libraries. Thus, in some approaches registering for a subset of available resources in one or more magnetic tape libraries includes registering for at least one tape cartridge stored in the one or more magnetic tape libraries.

In some approaches, the process of registering for a subset of available resources in the one or more magnetic tape libraries involves creating a record that is globally available to the plurality of distributed accessor nodes in the storage system. In other words, a record which is available across the distributed system is used to register for the subset of resources. Depending on the approach, the globally available record may vary, e.g., as described above. For instance, in some approaches the globally available record is in the form of a lock file that is stored in the distributed disk file system. However, in other approaches the globally available record is in the form of a database record that is stored in the distributed disk file system and/or stored in an external database. It should also be noted that the term "globally available" as used herein is intended to refer to the distributed data storage system as a whole. Thus, a record which is "globally available" is available to any component and/or at any location in the distributed data storage system, e.g., as would be appreciated by one skilled in the art after reading the present description.

Each of the TI nodes may be able to identify (e.g., see) each of the tape library resources (e.g., tape drives, tape cartridges, etc.) that are available in the tape libraries. Tape drives, tape cartridges, etc., can even be recorded in a specific file or a database table. Based on whether tape drive configurations are direct or switched, it is possible that the tape drives for each node are not allocated. Tape library resources registration for each access node may also involve implementing consistent hash algorithms to overcome resource contention situations. For example, resource index=hash(node_name)/(available resources).

Moreover, as noted above, the one or more magnetic tape libraries may be physically and/or wirelessly electrically coupled to the plurality of distributed accessor nodes, e.g., depending on the approach (e.g., see FIGS. 10A-10C above). According to some approaches, one or more of the accessor nodes are coupled to one or more tape drives in the tape libraries by storage network switches. In such approaches, the process of registering for a subset of available resources in the tape libraries may involve implementing a serialized shared use of the tape library resources. Moreover, tape library resources may be registered to a given accessor node by simply registering for the tape drives which are used to mount the desired magnetic tape(s).

Referring still to FIG. 12, operation 1206 further includes managing the registered subset of available resources. Depending on the approach, managing the registered subset of available resources may involve determining whether the resources are still operational (e.g., have experienced any failure events), have been requested by any other accessor nodes, have remained idle for a predetermined amount of time, etc., depending on the approach. However, proceeding to operation 1208, there method 1200 includes scheduling a performance of the subset of data operations using the registered subset of available resources. With respect to the present description, scheduling a performance of the subset of data operations may be achieved by sending one or more requests, commands, operations, instructions, etc., to the tape library resources that have been registered to the given accessor node. For instance, one or more instructions may be sent to a tape drive to write data to a magnetic tape that has been mounted therein, read data from the magnetic tape, etc.

Proceeding to decision 1210, method 1200 includes determining whether the subset of data operations has been completed. In response to determining that the subset of data operations have not yet been completed, method 1200 preferably waits a predetermined amount of time before repeating decision 1210. However, in some approaches a status inquiry may be sent to the tape library resources to determine an amount of the data operations have been completed.

In response to determining that the subset of data operations has finally been completed, method 1200 proceeds to operation 1212. There, operation 1212 includes releasing the subset of available resources in the one or more magnetic tape libraries, e.g., such that they may be registered (e.g., used) by other accessor nodes to complete additional data operations that have been received. Moreover, the file-to-magnetic-tape information associated with each of the files is preferably updated in response to completing the given subset of data operations, e.g., when warranted. In some approaches, new accessor nodes and/or tape library resources may be introduced to the overarching distributed data storage system. In such approaches, a new accessor node that is added is preferably configured with tape drives together. This will simplify the initial hardware configuration and resource management logic. Moreover, the resource allocation that is performed for a newly added node involves the new accessor node registering itself for desired resources and data operations, e.g., according to established rules and/or charts.

As alluded to above, it is preferred that supplemental data operations which correspond to the subset of data operations are automatically received from the central location. In other words, supplemental data operations are automatically received from the central location as the initial data operation is updated over time. For example, a write operation may be updated over time as a given file is continually amended. In this example, the subsequent amendments to the given file are preferably automatically directed to the access node which has registered for the initial write operation, e.g., such that the subsequent amendments may be efficiently implemented in memory without experiencing any write errors, data fragmentation, undesirable write delays, etc. Thus, the one or more supplemental data operations may be used by the accessor node to update the subset of data operations registered thereto. Moreover, the scheduled performance may also be updated based on the updated subset of data operations, e.g., as would be appreciated by one skilled in the art after reading the present description.

It is also preferred that unused accessor nodes are able to assume any unfinished data operations which are registered to other accessor nodes which have experienced a failure event. In other words, it is preferred that the various accessor nodes in the distributed system are able to identify when a failure event has occurred, and assume responsibility for any unfinished data operations.

Accordingly, method 1200 may actually be performed in response to receiving an indication that one of the distributed accessor nodes has experienced a failure event. In such an approach, the subset of data operations registered to the given accessor node may actually be an unfinished portion of data operations that were previously registered to another failed accessor node. The subset of available resources in the one or more magnetic tape libraries which are registered to the given accessor node may also have been previously registered to the failed accessor node. However, in other approaches different tape library resources may be used to complete an unfinished portion of a subset of data operations. It follows that registering for the subset of the data operations is performed in response to receiving an indication that another of the distributed accessor nodes has experienced a failure event, e.g., as would be apparent to one skilled in the art after reading the present description.

It follows that various ones of the embodiments included herein are able to integrate magnetic tape storage systems with DDFSs. Some of the approaches included herein introduce processes for establishing an automated and serialized shared access procedure which may be implemented by multiple accessor nodes. These accessor nodes are able to use these processes to communicate with magnetic tape libraries such that data access operations are performed in an efficient and successful manner. Some of the approaches included herein are further able to compensate for failure events that are experienced at one or more of the accessor nodes, e.g., as described above. As a result, even in situations where an accessor node fails, the remaining operational accessor nodes are able to take over any outstanding data operations, e.g., using the tape resources already registered by the failed accessor node. Moreover, these improvements may be achieved with little to no changes to the DDFS in order to integrate it with magnetic tape storage according to some of the approaches described herein.

In other words, various ones of the approaches included herein introduce magnetic tape integration software for distributed management of data operations and resources which effectively moves performance bottlenecks associated with the management of the system resources and received operations from a single centralized node (as is experienced in conventional implementations) into a distributed function achieved by multiple nodes. This effectively allows for tape integration with a generic distributed disk file system, and even improves performance while also providing scalability of data operation processing.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as controller 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for integrating magnetic tape storage with a distributed disk file system, the computer-implemented method comprising:
   receiving an indication that a distributed accessor node coupled to a central location has experienced a failure event;
   in response to receiving the indication that the one of the distributed accessor nodes has experienced a failure event, registering for a subset of data operations that are recorded at the central location, wherein the central location is coupled to a plurality of distributed accessor nodes, wherein the subset of data operations is an unfinished portion of data operations previously registered to the failed accessor node;
   registering for a subset of available resources in one or more magnetic tape libraries that are coupled to the plurality of distributed accessor nodes, wherein the subset of available resources in the one or more magnetic tape libraries was previously registered to the failed accessor node;
   managing the registered subset of available resources; and
   scheduling a performance of the subset of data operations using the registered subset of available resources,
   wherein supplemental data operations which correspond to the subset of data operations are automatically received from the central location.

2. The computer-implemented method of claim 1, comprising:
   automatically receiving one or more supplemental data operations from the central location, wherein the one or more supplemental data operations correspond to the subset of data operations;
   using the one or more supplemental data operations to update the subset of data operations; and
   updating the scheduled performance based on the updated subset of data operations.

3. The computer-implemented method of claim 1, wherein the subset of data operations includes a data recall request previously registered to the failed accessor node, wherein the data recall request corresponds to given data stored in the one or more magnetic tape libraries, wherein only one copy of the given data is stored in the one or more magnetic tape libraries.

4. The computer-implemented method of claim 1, comprising:
   releasing the subset of available resources in the one or more magnetic tape libraries in response to the subset of data operations being completed,
   wherein registering for the subset of available resources in the one or more magnetic tape libraries includes: creating a record that is globally available to the plurality of distributed accessor nodes.

5. The computer-implemented method of claim 4, wherein the record that is globally available to the plurality of distributed accessor nodes is a lock file that is stored in the distributed disk file system.

6. The computer-implemented method of claim 4, wherein the record that is globally available to the plurality of distributed accessor nodes is a database record that is stored in the distributed disk file system and/or stored in an external database.

7. The computer-implemented method of claim 4, wherein the data operations include data migration and/or data recall requests, wherein creating a record that is globally available to the plurality of distributed accessor nodes includes using a Portable Operating System Interface (POSIX) compliant distributed file locking function.

8. The computer-implemented method of claim 1, wherein the computer-implemented method is performed by a first of the accessor nodes that are coupled to the central location of the distributed disk file system.

9. The computer-implemented method of claim 8, wherein the first accessor node is directly coupled to one or more tape drives included in the one or more magnetic tape libraries, wherein registering for the subset of available resources in the one or more magnetic tape libraries includes: registering for at least one tape cartridge stored in the one or more magnetic tape libraries.

10. The computer-implemented method of claim 8, wherein the first accessor node is coupled to one or more tape drives included in the one or more magnetic tape libraries by storage network switches.

11. The computer-implemented method of claim 1, wherein the distributed disk file system is mounted under a linear tape file system (LTFS) data management (DM) fuse layer, wherein the LTFS DM fuse layer is configured to selectively prevent direct access to the distributed disk file system.

12. A computer program product for integrating magnetic tape storage with a distributed disk file system, the computer program product comprising a computer readable storage medium having program instructions embodied therewith, the program instructions readable and/or executable by a processor to cause the processor to:
   register, by the processor, for a subset of data operations that are recorded at a central location, wherein the central location is coupled to a plurality of distributed accessor nodes;
   register, by the processor, for a subset of available resources in one or more magnetic tape libraries that are coupled to the plurality of distributed accessor nodes;
   manage, by the processor, the registered subset of available resources;
   schedule, by the processor, a performance of the subset of data operations using the registered subset of available resources, wherein supplemental data operations which correspond to the subset of data operations are automatically received from the central location;
   receive, by the processor, an indication that one of the distributed accessor nodes has experienced a failure event, wherein the subset of data operations is an unfinished portion of data operations previously registered to the failed accessor node, wherein the subset of available resources in the one or more magnetic tape libraries was previously registered to the failed accessor node; and
   register, by the processor, for the subset of the data operations in response to receiving the indication that the one of the distributed accessor nodes has experienced a failure event.

13. The computer program product of claim 12, wherein the program instructions are readable and/or executable by the processor to cause the processor to:

automatically receive, by the processor, one or more supplemental data operations from the central location, wherein the one or more supplemental data operations correspond to the subset of data operations;

use, by the processor, the one or more supplemental data operations to update the subset of data operations; and update, by the processor, the scheduled performance based on the updated subset of data operations.

14. The computer program product of claim 12, wherein the program instructions are readable and/or executable by the processor to cause the processor to:

release, by the processor, the subset of available resources in the one or more magnetic tape libraries in response to the subset of data operations being completed, wherein registering for the subset of available resources in the one or more magnetic tape libraries includes: creating a record that is globally available to the plurality of distributed accessor nodes.

15. The computer program product of claim 14, wherein the record that is globally available to the plurality of distributed accessor nodes is a lock file that is stored in the distributed disk file system, wherein the record that is globally available to the plurality of distributed accessor nodes does not include a timestamp.

16. The computer program product of claim 12, wherein the computer-implemented method is performed by a first of the accessor nodes that are coupled to the central location of the distributed disk file system.

17. The computer program product of claim 16, wherein the first accessor node is directly coupled to one or more tape drives included in the one or more magnetic tape libraries, wherein registering for the subset of available resources in the one or more magnetic tape libraries includes: registering for at least one tape cartridge stored in the one or more magnetic tape libraries.

18. The computer program product of claim 16, wherein the first accessor node is coupled to one or more tape drives included in the one or more magnetic tape libraries by storage network switches.

19. A system, comprising:

a processor; and logic integrated with the processor, executable by the processor, or integrated with and executable by the processor, the logic being configured to:

receive, by the processor, an indication that a distributed accessor node coupled to a central location has experienced a failure event;

in response to receiving the indication that the one of the distributed accessor nodes has experienced a failure event, register, by the processor, for a subset of data operations that are recorded at the central location, wherein the central location is coupled to a plurality of distributed accessor nodes, wherein the subset of data operations is an unfinished portion of data operations previously registered to the failed accessor node;

register, by the processor, for a subset of available resources in one or more magnetic tape libraries that are coupled to the plurality of distributed accessor nodes wherein the subset of available resources in the one or more magnetic tape libraries was previously registered to the failed accessor node;

manage, by the processor, the registered subset of available resources; and schedule, by the processor, a performance of the subset of data operations using the registered subset of available resources, wherein supplemental data operations which correspond to the subset of data operations are automatically received from the central location.

* * * * *